US010516977B2

(12) United States Patent
Zhi et al.

(10) Patent No.: US 10,516,977 B2
(45) Date of Patent: Dec. 24, 2019

(54) DATA PACKET TRANSMISSION METHOD AND DEVICE

(71) Applicant: Huawei Technologies Co., Ltd., Shenzhen, Guangdong (CN)

(72) Inventors: Yuliang Zhi, Tianjin (CN); Yanyan Chen, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 419 days.

(21) Appl. No.: 14/921,219

(22) Filed: Oct. 23, 2015

(65) Prior Publication Data
US 2016/0044479 A1 Feb. 11, 2016

Related U.S. Application Data

(63) Continuation of application No. PCT/CN2013/074568, filed on Apr. 23, 2013.

(51) Int. Cl.
*H04W 4/20* (2018.01)
*H04W 4/70* (2018.01)
(Continued)

(52) U.S. Cl.
CPC .............. *H04W 4/20* (2013.01); *H04W 4/70* (2018.02); *H04W 48/20* (2013.01); *H04W 68/005* (2013.01); *H04W 36/02* (2013.01)

(58) Field of Classification Search
CPC .................................. H04W 4/20; H04W 76/02
See application file for complete search history.

(56) References Cited

U.S. PATENT DOCUMENTS

| | | | |
|---|---|---|---|
| 2012/0282956 A1* | 11/2012 | Kim | H04L 51/38 455/466 |
| 2013/0051338 A1* | 2/2013 | Ryu | H04W 4/005 370/329 |

(Continued)

FOREIGN PATENT DOCUMENTS

| | | |
|---|---|---|
| CN | 102223715 A | 10/2011 |
| CN | 102333293 A | 1/2012 |

(Continued)

OTHER PUBLICATIONS

"3rd Generation Partnership Project; Technical Specification Group Services and System Aspects; Machine-Type and other Mobile Data Applications Communications Enhancements (Release 12)", 3GPP TR 23.887 V0.8.0, Feb. 2013, 107 pages.

(Continued)

*Primary Examiner* — Derrick W Ferris
*Assistant Examiner* — Farhad Ali
(74) *Attorney, Agent, or Firm* — Womble Bond Dickinson (US) LLP

(57) ABSTRACT

Embodiments of the present invention provide a data packet transmission method and a device, which relate to the communications field, so as to reduce a storage burden on a base station in a data transmission process. The method includes: acquiring, by a base station that serves a UE, instruction information of a small data packet; and after receiving a radio resource control message sent from the UE, acquiring, by the base station that serves the UE, the small data packet from a core network device according to the instruction information of the small data packet, and sending the small data packet to the UE. The embodiments of the present invention are used for data packet transmission.

15 Claims, 8 Drawing Sheets

(51) Int. Cl.
*H04W 48/20* (2009.01)
*H04W 68/00* (2009.01)
*H04W 36/02* (2009.01)

(56) References Cited

U.S. PATENT DOCUMENTS

| | | | | |
|---|---|---|---|---|
| 2013/0324141 A1* | 12/2013 | Jung | ................ | H04W 4/005 |
| | | | | 455/450 |
| 2014/0016614 A1* | 1/2014 | Velev | ................ | H04W 4/70 |
| | | | | 370/331 |
| 2015/0172847 A1* | 6/2015 | Yang | ................ | H04W 4/70 |
| | | | | 370/328 |

FOREIGN PATENT DOCUMENTS

| | | |
|---|---|---|
| CN | 102340754 A | 2/2012 |
| CN | 102769842 A | 11/2012 |
| EP | 2509345 A1 | 10/2012 |
| WO | WO 2012/136374 A2 | 10/2012 |
| WO | WO 2013/028026 A2 | 2/2013 |

OTHER PUBLICATIONS

"3rd Generation Partnership Project; Technical Specification Group Radio Access Network; Radio Resource Control (RRC); Protocol specification (Release 11)", 3GPP TS 25.331 V11.5.0, Mar. 2013, 2079 pages.

\* cited by examiner

DATA PACKET TRANSMISSION METHOD AND DEVICE

CROSS-REFERENCE TO RELATED APPLICATIONS

This application is a continuation of International Application No. PCT/CN2013/074568, filed on Apr. 23, 2013, which is hereby incorporated by reference in its entirety.

TECHNICAL FIELD

The present invention relates to the communications field, and in particular, to a data packet transmission method and a device.

BACKGROUND

Application of machine type communication (MTC) refers to data transmission of one or more network elements without human involvement. In the prior art, when a core network device receives a small data packet sent from an machine type communication (MTC) server, the small data packet is transmitted to a User equipment (UE) according to the following steps, where the small data packet refers to a small-sized data packet that sends a relatively small amount of data, and data transmission can be completed generally by using one or more data packets. Because a data amount of small data packets is relatively small and transmission time is also relatively short, there is no need to establish a data channel for these data packets.

S1. The core network device sends a first paging message to a base station that serves the UE, where the first paging message includes the small data packet, and the core network device may be an mobility management entity (MME).

S2. The base station that serves the UE sends a second paging message to the UE, so that the UE sends a radio resource control (RRC) connection establishment request message to the base station that serves the UE according to the second paging message.

S3. After receiving the RRC connection establishment request message, the base station that serves the UE sends an RRC connection establishment message to the UE, where the connection establishment message includes the small data packet.

It can be learned from the foregoing steps that the paging message sent from the core network device to the UE includes the small data packet, so that the base station that serves the UE sends the small data packet to the UE in a process in which the UE performs RRC connection establishment according to a second paging message. However, when the UE does not respond long after the base station that serves the UE sends the second paging message, the base station that serves the UE sends the second paging message again. Consequently, in this process, the small data packet is stored in the base station that serves the UE for a relatively long time. When the base station that serves the UE needs to initiate calls including small data packets to multiple UEs, a quantity of small data packets that are temporarily stored is excessively great, thereby putting a heavier storage burden on the base station that serves the UE, and further affecting data transmission of the base station that serves the UE. In addition, when initiating paging, the core network device sends a first paging message that includes the small data packet to all base stations within a tracking area (TA) location area of a core network with which the UE is registered. Each base station that receives the first paging message pages, within a cell of the base station, the UE. In a process of paging the UE, the base station temporarily stores the small data packet for the UE. Therefore, small data packets that are temporarily stored also put a heavier storage burden on a non-base station that serves the UE.

SUMMARY

The present invention provides a data packet transmission method and a device, so as to reduce a storage burden on a base station in a data transmission process.

According to a first aspect, a data packet transmission method is provided, including: acquiring, by a base station that serves user equipment (UE), instruction information of a small data packet, where the instruction information of the small data packet instructs the base station that serves the UE to transmit the small data packet; acquiring, by the base station that serves the UE after receiving a radio resource control message sent from the UE, the small data packet from a core network device according to the instruction information of the small data packet; and sending, by the base station that serves the UE, the small data packet to the UE.

In a first possible implementation manner of the first aspect, the acquiring, by a base station that serves a UE, instruction information of a small data packet includes: receiving, by the base station that serves the UE, a first paging message sent from the core network device, where the first paging message includes the instruction information of the small data packet.

With reference to the first aspect and the first possible implementation manner, in a second possible implementation manner, the acquiring, by the base station that serves the UE after receiving a radio resource control message sent from the UE, the small data packet from a core network device according to the instruction information of the small data packet includes: after receiving a radio resource control protocol RRC connection establishment request message sent from the UE, sending, by the base station that serves the UE, a paging response message to the core network device according to the instruction information of the small data packet, and receiving the small data packet that is sent from the core network device according to the paging response message.

With reference to any one of the first aspect to the second possible implementation manner, in a third possible implementation manner, the sending, by the base station that serves the UE, the small data packet to the UE includes: sending, by the base station that serves the UE, an RRC connection establishment message to the UE, where the RRC connection establishment message includes the small data packet.

With reference to any one of the first possible implementation manner to the third possible implementation manner, in a fourth possible implementation manner, after the receiving, by the base station that serves the UE, a first paging message sent from the core network device, the method further includes: sending a second paging message to the UE, where the second paging message includes RRC connection establishment waiting time, and the RRC connection establishment waiting time is used for enabling the UE to send another RRC connection establishment request message to the base station that serves the UE again when the RRC connection establishment waiting time expires before the RRC connection establishment message sent from the base station that serves the UE is received; or sending a second paging message to the UE, where the second paging message includes the instruction information of the small data packet, so that the UE sends another RRC connection establishment request message to the base station that serves the UE again when set RRC connection establishment waiting time expires before the RRC connection establishment message sent from the base station that serves the UE is received.

With reference to the first aspect, in a fifth possible implementation manner of the first aspect, before the base station that serves the UE acquires the small data packet from the core network device according to the instruction information of the small data packet, when a current base station that serves the UE changes to the base station that serves the UE, the acquiring, by a base station that serves a UE, instruction information of a small data packet includes: receiving, by the base station that serves the UE, an RRC connection establishment request message sent from the UE, where the RRC connection establishment request message includes the instruction information of the small data packet; the acquiring, by the base station that serves the UE after receiving a radio resource control message sent from the UE, the small data packet from a core network device according to the instruction information of the small data packet includes: sending, by the base station that serves the UE after receiving the RRC connection establishment request message sent from the UE, a paging response message to the core network device according to the instruction information of the small data packet; and receiving, by the base station that serves the UE, the small data packet that is sent from the core network device according to the paging response message; the sending, by the base station that serves the UE, the small data packet to the UE includes: sending, by the base station that serves the UE, an RRC connection establishment message to the UE, where the RRC connection establishment message includes the small data packet.

With reference to the first aspect, in a sixth possible implementation manner of the first aspect, before the base station that serves the UE acquires the small data packet from the core network device according to the instruction information of the small data packet, when a current base station that serves the UE changes to the base station that serves the UE and a location area of the UE is updated, the acquiring, by a base station that serves a UE, instruction information of a small data packet includes: receiving, by the base station that serves the UE, an RRC connection establishment request message sent from the UE, where the RRC connection establishment request message includes the instruction information of the small data packet; the acquiring, by the base station that serves the UE after receiving a radio resource control message sent from the UE, the small data packet from a core network device according to the instruction information of the small data packet includes: sending, by the base station that serves the UE after receiving a first location update message sent from the UE, a second location update message to the core network device according to the first location update message, where the second location update message includes the instruction information of the small data packet; and receiving, by the base station that serves the UE, a first location updating response message that is sent from the core network device according to the second location update message, where the first location updating response message includes the small data packet; the sending, by the base station that serves the UE, the small data packet to the UE includes: sending, by the base station that serves the UE, the first location updating response message to the UE.

With reference to the first aspect, in a seventh possible implementation manner of the first aspect, before the base station that serves the UE acquires the small data packet from the core network device according to the instruction information of the small data packet, when a current base station that serves the UE changes to the base station that serves the UE, the current base station that serves the UE corresponds to a first core network device, the base station that serves the UE corresponds to a second core network device, and a location area of the UE is updated, the acquiring, by a base station that serves a UE, instruction information of a small data packet includes: receiving, by the base station that serves the UE, an RRC connection establishment request message sent from the UE, where the RRC connection establishment request message includes the instruction information of the small data packet; the acquiring, by the base station that serves the UE after receiving a radio resource control message sent from the UE, the small data packet from a core network device according to the instruction information of the small data packet includes: sending, by the base station that serves the UE after receiving a first location update message sent from the UE, a second location update message to the second core network device according to the first location update message, where the second location update message includes the instruction information of the small data packet, so that the second core network device acquires the small data packet from the first core network device according to the instruction information of the small data packet; and receiving, by the base station that serves the UE, a second location updating response message sent from the second core network device, where the second location updating response message includes the small data packet; the sending, by the base station that serves the UE, the small data packet to the UE includes: sending, by the base station that serves the UE, the second location updating response message that includes the small data packet to the UE.

According to a second aspect, a data packet transmission method is provided, including: acquiring, by a core network device, a small data packet; and sending, by the core network device, instruction information of the small data packet to a base station that serves a UE, so that after receiving a radio resource control message sent from the UE, the base station that serves the UE acquires the small data packet from the core network device according to the instruction information of the small data packet and sends the small data packet to the UE, where the instruction information of the small data packet instructs the base station that serves the UE to transmit the small data packet.

In a first possible implementation manner of the second aspect, the sending, by the core network device, instruction information of the small data packet to a base station that serves a UE, so that after receiving a radio resource control message sent from the UE, the base station that serves the UE acquires the small data packet from the core network device according to the instruction information of the small data packet and sends the small data packet to the UE includes: sending, by the core network device, a first paging message to the base station that serves the UE, where the first paging message includes the instruction information of the small data packet, so that after receiving an RRC connection establishment request message sent from the UE, the base station that serves the UE acquires the small data packet from the core network device according to the instruction information of the small data packet and sends an RRC connection establishment message to the UE, where the RRC connection establishment message includes the small data packet.

With reference to the first possible implementation manner of the second aspect, in a second possible implementation manner, the first paging message further includes RRC connection establishment waiting time, so that the base station that serves the UE sends a second paging message that includes the RRC connection establishment waiting time to the UE, where the RRC connection establishment waiting time is used for enabling the UE to send another RRC connection establishment request message to the base station that serves the UE again when the RRC connection establishment waiting time expires before the RRC connection establishment message sent from the base station that serves the UE is received; or a second paging message that is sent from the base station that serves the UE to the UE includes the instruction information of the small data packet, so that the UE sends another RRC connection establishment request message to the base station that serves the UE again when set RRC connection establishment waiting time expires before the RRC connection establishment message sent from the base station that serves the UE is received.

With reference to the second aspect, in a third possible implementation manner of the second aspect, before the base station that serves the UE acquires the small data packet from the core network device according to the instruction information of the small data packet, when the base station that serves the UE changes from a current base station that serves the UE to a target base station that serves the UE, the sending, by the core network device, instruction information of the small data packet to a base station that serves a UE, so that after receiving a radio resource control message sent from the UE, the base station that serves the UE acquires the small data packet from the core network device according to the instruction information of the small data packet and sends the small data packet to the UE includes: sending, by the core network device, a first paging message to the current base station that serves the UE, so that the current base station that serves the UE sends a second paging message to the UE, and after receiving an RRC connection establishment request message that is sent from the UE according to the second paging message, the target base station that serves the UE acquires the small data packet from the core network device according to the instruction information that is of the small data packet and included in the RRC connection establishment request message, and sends an RRC connection establishment message to the UE, where the first paging message and the second paging message include the instruction information of the small data packet, and the RRC connection establishment message includes the small data packet.

According to a third aspect, a data packet transmission method is provided, including: acquiring, by a UE, instruction information that is of a small data packet and sent from a current base station that serves the UE, where the instruction information of the small data packet instructs a target base station that serves the UE to transmit the small data packet; after the current base station that serves the UE changes to the target base station that serves the UE, sending the instruction information of the small data packet to the target base station that serves the UE, so that the target base station that serves the UE acquires the small data packet from a core network device according to the instruction information of the small data packet; and receiving the small data packet sent from the target base station that serves the UE.

In a first possible implementation manner of the third aspect, the acquiring, by a UE, instruction information that is of a small data packet and sent from a current base station that serves the UE includes: after the current base station that serves the UE receives a first paging message sent from the core network device, receiving a second paging message sent from the current base station that serves the UE, where both the first paging message and the second paging message include the instruction information of the small data packet.

With reference to the third aspect or the first possible implementation manner of the third aspect, in a second possible implementation manner, the sending the instruction information of the small data packet to the target base station that serves the UE, so that the target base station that serves the UE acquires the small data packet from a core network device according to the instruction information of the small data packet includes: sending an RRC connection establishment request message to the target base station that serves the UE, where the RRC connection establishment request message includes the instruction information of the small data packet, so that the target base station that serves the UE sends a paging response message to the core network device according to the instruction information of the small data packet and receives the small data packet that is sent from the core network device according to the paging response message; the receiving the small data packet sent from the target base station that serves the UE includes: receiving an RRC connection establishment message sent from the target base station that serves the UE, where the RRC connection establishment message includes the small data packet.

With reference to the third aspect or the first possible implementation manner of the third aspect, in a third possible implementation manner, when a location area of the UE is updated, the sending the instruction information of the small data packet to the target base station that serves the UE, so that the target base station that serves the UE acquires the small data packet from a core network device according to the instruction information of the small data packet includes: sending an RRC connection establishment request message to the target base station that serves the UE, where the RRC connection establishment request message includes the instruction information of the small data packet, so that after receiving a first location update message sent from the UE, the target base station that serves the UE sends a second location update message to the core network device according to the first location update message and receives a first location updating response message that is sent from the core network device according to the second location update message, where the second location update message includes the instruction information of the small data packet, and the first location updating response message includes the small data packet; the receiving the small data packet sent from the target base station that serves the UE includes: receiving the first location updating response message sent from the target base station that serves the UE.

With reference to the third aspect or the first possible implementation manner of the third aspect, in a fourth possible implementation manner, when a location area of the UE is updated, the current base station that serves the UE corresponds to a first core network device, and the target base station that serves the UE corresponds to a second core network device, the sending the instruction information of the small data packet to the target base station that serves the UE, so that the target base station that serves the UE acquires the small data packet from a core network device according to the instruction information of the small data packet includes: sending an RRC connection establishment request message to the target base station that serves the UE, where the RRC connection establishment request message includes the instruction information of the small data packet, so that after receiving a first location update message sent from the UE, the target base station that serves the UE sends a second location update message to the second core network device according to the first location update message, where the second location update message includes the instruction information of the small data packet, so that the second core network device acquires the small data packet from the first core network device according to the instruction information of the small data packet, and the target base station that serves the UE receives a second location updating response message sent from the second core network device, where the second location updating response message includes the small data packet; the receiving the small data packet sent from the target base station that serves the UE includes: receiving the second location updating response message sent from the target base station that serves the UE.

With reference to the second possible implementation manner or the fourth possible implementation manner, in a fifth possible implementation manner, the second paging message further includes RRC connection establishment waiting time, and the RRC connection establishment waiting time is used for enabling the UE to: send another RRC connection establishment request message to the target base station that serves the UE again when the RRC connection establishment waiting time expires before the RRC connection establishment message sent from the target base station that serves the UE is received; or, after the RRC connection establishment request message is sent to the target base station that serves the UE, send another RRC connection establishment request message to the target base station that serves the UE again when set RRC connection establishment waiting time expires before the RRC connection establishment message sent from the target base station that serves the UE is received.

According to a fourth aspect, a base station is provided, including: an acquiring unit, configured to acquire instruction information of a small data packet, where the instruction information of the small data packet instructs a base station that serves a UE to transmit the small data packet; and after a radio resource control message sent from the UE is received, acquire the small data packet from a core network device according to the instruction information of the small data packet; and a sending unit, configured to send the small data packet acquired by the acquiring unit to the UE.

In a first possible implementation manner of the fourth aspect, the acquiring unit is further configured to receive a first paging message sent from the core network device, where the first paging message includes the instruction information of the small data packet.

With reference to the fourth aspect or the first possible implementation manner of the fourth aspect, in a second possible implementation manner, the sending unit is further configured to, after a radio resource control (RRC) connection establishment request message sent from the UE is received, send a paging response message to the core network device according to the instruction information that is of the small data packet and acquired by the acquiring unit; and the acquiring unit is further configured to receive the small data packet that is sent from the core network device according to the paging response message.

With reference to any one of the fourth aspect to the second possible implementation manner of the fourth aspect, in a third possible implementation manner, the sending unit is further configured to send an RRC connection establishment message to the UE, where the RRC connection establishment message includes the small data packet.

With reference to any one of the first possible implementation manner to the third possible implementation manner, in a fourth possible implementation manner, the sending unit is further configured to, after the acquiring unit receives the first paging message sent from the core network device, send a second paging message to the UE, where the second paging message includes RRC connection establishment waiting time, and the RRC connection establishment waiting time is used for enabling the UE to send another RRC connection establishment request message to the base station again when the RRC connection establishment waiting time expires before the RRC connection establishment message sent from the base station is received; or the sending unit is further configured to, after the acquiring unit receives the first paging message sent from the core network device, send a second paging message to the UE, where the second paging message includes the instruction information of the small data packet, so that the UE sends another RRC connection establishment request message to the base station again when set RRC connection establishment waiting time expires before the RRC connection establishment message sent from the base station is received.

With reference to the fourth aspect, in a fifth possible implementation manner of the fourth aspect, the acquiring unit is further configured to, when a current base station that serves the UE changes to the base station, receive an RRC connection establishment request message sent from the UE, where the RRC connection establishment request message includes the instruction information of the small data packet; the sending unit is further configured to, after the acquiring unit receives the RRC connection establishment request message sent from the UE, send a paging response message to the core network device according to the instruction information that is of the small data packet and acquired by the acquiring unit; the acquiring unit is further configured to receive the small data packet that is sent from the core network device according to the paging response message; and the sending unit is further configured to send an RRC connection establishment message to the UE, where the RRC connection establishment message includes the small data packet.

With reference to the fourth aspect, in a sixth possible implementation manner of the fourth aspect, the acquiring unit is further configured to, when a current base station that serves the UE changes to the base station and a location area of the UE is updated, receive an RRC connection establishment request message sent from the UE, where the RRC connection establishment request message includes the instruction information of the small data packet; the sending unit is further configured to, after the acquiring unit receives a first location update message sent from the UE, send a second location update message to the core network device according to the first location update message received by the acquiring unit, where the second location update message includes the instruction information of the small data packet; the acquiring unit is further configured to receive a first location updating response message that is sent from the core network device according to the second location update message, where the first location updating response message includes the small data packet; and the sending unit is further configured to send the first location updating response message to the UE.

With reference to the fourth aspect, in a seventh possible implementation manner of the fourth aspect, the acquiring unit is further configured to, when a current base station that serves the UE changes to the base station, the current base station that serves the UE corresponds to a first core network device, the base station that serves the UE corresponds to a second core network device, and a location area of the UE is updated, receive an RRC connection establishment request message sent from the UE, where the RRC connection establishment request message includes the instruction information of the small data packet; the sending unit is further configured to, after the acquiring unit receives the radio resource control message sent from the UE, send a second location update message to the second core network device according to a first location update message, where the second location update message includes the instruction information of the small data packet, so that the second core network device acquires the small data packet from the first core network device according to the instruction information of the small data packet; the acquiring unit is further configured to receive a second location updating response message sent from the second core network device, where the second location updating response message includes the small data packet; and the sending unit is further configured to send the second location updating response message that includes the small data packet to the UE.

According to a fifth aspect, a core network device is provided, including: an acquiring unit, configured to acquire a small data packet; a sending unit, configured to send instruction information of the small data packet to a base station that serves a UE, so that after receiving a radio resource control message sent from the UE, the base station that serves the UE acquires the small data packet from a core network device according to the instruction information of the small data packet and sends the small data packet to the UE, where the instruction information of the small data packet instructs the base station that serves the UE to transmit the small data packet.

In a first possible implementation manner of the fifth aspect, the sending unit is further configured to send a first paging message to the base station that serves the UE, where the first paging message includes the instruction information of the small data packet, so that after receiving an RRC connection establishment request message sent from the UE, the base station that serves the UE acquires the small data packet from the core network device according to the instruction information of the small data packet and sends an RRC connection establishment message to the UE, where the RRC connection establishment message includes the small data packet.

With reference to the first possible implementation manner, in a second possible implementation manner, the first paging message further includes RRC connection establishment waiting time, so that the base station that serves the UE sends a second paging message that includes the RRC connection establishment waiting time to the UE, where the RRC connection establishment waiting time is used for enabling the UE to send another RRC connection establishment request message to the base station that serves the UE again when the RRC connection establishment waiting time expires before the RRC connection establishment message sent from the base station that serves the UE is received; or a second paging message that is sent from the base station that serves the UE to the UE includes the instruction information of the small data packet, so that the UE sends another RRC connection establishment request message to the base station that serves the UE again when set RRC connection establishment waiting time expires before the RRC connection establishment message sent from the base station that serves the UE is received.

With reference to the fifth aspect, in a third possible implementation manner of the fifth aspect, the sending unit is further configured to, when the base station that serves the UE changes from a current base station that serves the UE to a target base station that serves the UE, send a first paging message to the current base station that serves the UE, so that the current base station that serves the UE sends a second paging message to the UE, and after receiving an RRC connection establishment request message that is sent from the UE according to the second paging message, the target base station that serves the UE acquires the small data packet from the core network device according to the instruction information that is of the small data packet and included in the RRC connection establishment request message, and sends an RRC connection establishment message to the UE, where the first paging message and the second paging message include the instruction information of the small data packet, and the RRC connection establishment message includes the small data packet.

According to a sixth aspect, a UE is provided, including: an acquiring unit, configured to acquire instruction information that is of a small data packet and sent from a current base station that serves the UE, where the instruction information of the small data packet instructs a target base station that serves the UE to transmit the small data packet; and a sending unit, configured to, after the current base station that serves the UE changes to the target base station that serves the UE, send the instruction information that is of the small data packet and acquired by the acquiring unit to the target base station that serves the UE, so that the target base station that serves the UE acquires the small data packet from the core network device according to the instruction information of the small data packet, where the acquiring unit is further configured to receive the small data packet sent from the target base station that serves the UE.

In a first possible implementation manner of the sixth aspect, the acquiring unit is further configured to, after the current base station that serves the UE receives a first paging message sent from the core network device, receive a second paging message sent from the current base station that serves the UE, where both the first paging message and the second paging message include the instruction information of the small data packet.

With reference to the sixth aspect or the first possible implementation manner of the sixth aspect, in a second possible implementation manner, the sending unit is further configured to send an RRC connection establishment request message to the target base station that serves the UE, where the RRC connection establishment request message includes the instruction information of the small data packet, so that the target base station that serves the UE sends a paging response message to the core network device according to the instruction information of the small data packet and receives the small data packet that is sent from the core network device according to the paging response message; and the acquiring unit is further configured to receive an RRC connection establishment message sent from the target base station that serves the UE, where the RRC connection establishment message includes the small data packet.

With reference to the sixth aspect or the first possible implementation manner of the sixth aspect, in a third possible implementation manner, when a location area of the UE is updated, the sending unit is further configured to send an RRC connection establishment request message to the target base station that serves the UE, where the RRC connection establishment request message includes the instruction information of the small data packet, so that after receiving a first location update message sent from the UE, the target base station that serves the UE sends a second location update message to the core network device according to the first location update message and receives a first location updating response message that is sent from the core network device according to the second location update message, where the second location update message includes the instruction information of the small data packet, and the first location updating response message includes the small data packet; and the acquiring unit is further configured to receive the first location updating response message sent from the target base station that serves the UE.

With reference to the sixth aspect or the first possible implementation manner of the sixth aspect, in a fourth possible implementation manner, when a location area of the UE is updated, the current base station that serves the UE corresponds to a first core network device, and the target base station that serves the UE corresponds to a second core network device, the sending unit is further configured to send an RRC connection establishment request message to the target base station that serves the UE, where the RRC connection establishment request message includes the instruction information of the small data packet, so that after receiving a first location update message sent from the UE, the target base station that serves the UE sends a second location update message to the second core network device according to the first location update message, where the second location update message includes the instruction information of the small data packet, so that the second core network device acquires the small data packet from the first core network device according to the instruction information of the small data packet, and the target base station that serves the UE receives a second location updating response message sent from the second core network device, where the second location updating response message includes the small data packet; and the acquiring unit is further configured to receive the second location updating response message sent from the target base station that serves the UE.

With reference to any one of the second possible implementation manner to the fourth possible implementation manner, in a fifth possible implementation manner, the second paging message further includes RRC connection establishment waiting time, and the sending unit is further configured to send another RRC connection establishment request message to the target base station that serves the UE again when the RRC connection establishment waiting time expires before the RRC connection establishment message sent from the target base station that serves the UE is received; or, the sending unit is further configured to, after the RRC connection establishment request message is sent to the target base station that serves the UE, send another RRC connection establishment request message to the target base station that serves the UE again when set RRC connection establishment waiting time expires before the RRC connection establishment message sent from the target base station that serves the UE is received.

According to a seventh aspect, a base station is provided, including: a processor, configured to acquire instruction information of a small data packet, where the instruction information of the small data packet instructs a base station that serves a UE to transmit the small data packet; and after a radio resource control message sent from the UE is received, acquire the small data packet from a core network device according to the instruction information of the small data packet; and a transmitter, configured to send the small data packet acquired by the processor to the UE.

In a first possible implementation manner of the seventh aspect, the processor is further configured to receive a first paging message sent from the core network device, where the first paging message includes the instruction information of the small data packet.

With reference to the seventh aspect or the first possible implementation manner of the seventh aspect, in a second possible implementation manner, the processor is further configured to, after an RRC connection establishment request message sent from the UE is received, send a paging response message to the core network device according to the instruction information of the small data packet and receive the small data packet that is sent from the core network device according to the paging response message.

With reference to any one of the seventh aspect to the second possible implementation manner, in a third possible implementation manner, the transmitter is further configured to send an RRC connection establishment message to the UE, where the RRC connection establishment message includes the small data packet.

With reference to any one of the first possible implementation manner to the third possible implementation manner, in a fourth possible implementation manner, the transmitter is further configured to, after the processor receives the first paging message sent from the core network device, send a second paging message to the UE, where the second paging message includes RRC connection establishment waiting time, and the RRC connection establishment waiting time is used for enabling the UE to send another RRC connection establishment request message to the base station again when the RRC connection establishment waiting time expires before the RRC connection establishment message sent from the base station is received; or, the transmitter is further configured to, after the processor receives the first paging message sent from the core network device, send a second paging message to the UE, where the second paging message includes the instruction information of the small data packet, so that the UE sends another RRC connection establishment request message to the base station again when set RRC connection establishment waiting time expires before the RRC connection establishment message sent from the base station is received.

With reference to the seventh aspect, in a fifth possible implementation manner, the processor is further configured to, when a current base station that serves the UE changes to the base station, receive an RRC connection establishment request message sent from the UE, where the RRC connection establishment request message includes the instruction information of the small data packet; the transmitter is further configured to, after the processor receives the RRC connection establishment request message sent from the UE, send a paging response message to the core network device according to the instruction information that is of the small data packet and acquired by the processor; the processor is further configured to receive the small data packet that is sent from the core network device according to the paging response message; and the transmitter is further configured to send an RRC connection establishment message to the UE, where the RRC connection establishment message includes the small data packet.

With reference to the seventh aspect, in a sixth possible implementation manner, the processor is further configured to, when a current base station that serves the UE changes to the base station and a location area of the UE is updated, receive an RRC connection establishment request message sent from the UE, where the RRC connection establishment request message includes the instruction information of the small data packet; the transmitter is further configured to, after the processor receives a first location update message sent from the UE, send a second location update message to the core network device according to the first location update message received by the processor, where the second location update message includes the instruction information of the small data packet; the processor is further configured to receive a first location updating response message that is sent from the core network device according to the second location update message, where the first location updating response message includes the small data packet; and the transmitter is further configured to send the first location updating response message to the UE.

With reference to the seventh aspect, in a seventh possible implementation manner, the processor is further configured to, when a current base station that serves the UE changes to the base station, the current base station that serves the UE corresponds to a first core network device, the base station that serves the UE corresponds to a second core network device, and a location area of the UE is updated, receive an RRC connection establishment request message sent from the UE, where the RRC connection establishment request message includes the instruction information of the small data packet; the transmitter is further configured to, after the processor receives the radio resource control message sent from the UE, send a second location update message to the second core network device according to the first location update message, where the second location update message includes the instruction information of the small data packet, so that the second core network device acquires the small data packet from the first core network device according to the instruction information of the small data packet; the processor is further configured to receive a second location updating response message sent from the second core network device, where the second location updating response message includes the small data packet; and the transmitter is further configured to send the second location updating response message that includes the small data packet to the UE.

According to an eighth aspect, a core network device is provided, including: a processor, configured to acquire a small data packet; and a transmitter, configured to send instruction information of the small data packet to a base station that serves a UE, so that after receiving a radio resource control message sent from the UE, the base station that serves the UE acquires the small data packet from the core network device according to the instruction information of the small data packet and sends the small data packet to the UE, where the instruction information of the small data packet instructs the base station that serves the UE to transmit the small data packet.

In a first possible implementation manner of the eighth aspect, the transmitter is further configured to send a first paging message to the base station that serves the UE, where the first paging message includes the instruction information of the small data packet, so that after receiving an RRC connection establishment request message sent from the UE, the base station that serves the UE acquires the small data packet from the core network device according to the instruction information of the small data packet and sends an RRC connection establishment message to the UE, where the RRC connection establishment message includes the small data packet.

In a second possible implementation manner of the eighth aspect, the transmitter is further configured to, when the base station that serves the UE changes from a current base station that serves the UE to a target base station that serves the UE, send a first paging message to the current base station that serves the UE, so that the current base station that serves the UE sends a second paging message to the UE, and after receiving an RRC connection establishment request message that is sent from the UE according to the second paging message, the target base station that serves the UE acquires the small data packet from the core network device according to the instruction information that is of the small data packet and included in the RRC connection establishment request message, and sends an RRC connection establishment message to the UE, where the first paging message and the second paging message include the instruction information of the small data packet, and the RRC connection establishment message includes the small data packet.

According to a ninth aspect, a UE is provided, including: a processor, configured to acquire instruction information that is of a small data packet and sent from a current base station that serves the UE, where the instruction information of the small data packet instructs a target base station that serves the UE to transmit the small data packet; and a transmitter, configured to, after the current base station that serves the UE changes to the target base station that serves the UE, send the instruction information that is of the small data packet and acquired by the processor to the target base station that serves the UE, so that the target base station that serves the UE acquires the small data packet from a core network device according to the instruction information of the small data packet; where the processor is further configured to receive the small data packet sent from the target base station that serves the UE.

In a first possible implementation manner of the ninth aspect, the processor is further configured to, after the current base station that serves the UE receives a first paging message sent from the core network device, receive a second paging message sent from the current base station that serves the UE, where both the first paging message and the second paging message include the instruction information of the small data packet.

With reference to the ninth aspect or the first possible implementation manner, in a second possible implementation manner, the transmitter is further configured to send an RRC connection establishment request message to the target base station that serves the UE, where the RRC connection establishment request message includes the instruction information of the small data packet, so that the target base station that serves the UE sends a paging response message to the core network device according to the instruction information of the small data packet and receives the small data packet that is sent from the core network device according to the paging response message; and the processor is further configured to receive an RRC connection establishment message sent from the target base station that serves the UE, where the RRC connection establishment message includes the small data packet.

With reference to the ninth aspect or the first possible implementation manner, in a third possible implementation manner, the transmitter is further configured to send an RRC connection establishment request message to the target base station that serves the UE, where the RRC connection establishment request message includes the instruction information of the small data packet, so that after receiving a first location update message sent from the UE, the target base station that serves the UE sends a second location update message to the core network device according to the first location update message and receives a first location updating response message that is sent from the core network device according to the second location update message, where the second location update message includes the instruction information of the small data packet, and the first location updating response message includes the small data packet; and the processor is further configured to receive the first location updating response message sent from the target base station that serves the UE.

With reference to the ninth aspect or the first possible implementation manner, in a fourth possible implementation manner, the transmitter is further configured to, when a location area of the UE is updated, the current base station that serves the UE corresponds to a first core network device, and the target base station that serves the UE corresponds to a second core network device, send an RRC connection establishment request message to the target base station that serves the UE, where the RRC connection establishment request message includes the instruction information of the small data packet, so that after receiving a first location update message sent from the UE, the target base station that serves the UE sends a second location update message to the second core network device according to the first location update message, where the second location update message includes the instruction information of the small data packet, so that the second core network device acquires the small data packet from the first core network device according to the instruction information of the small data packet, and the target base station that serves the UE receives a second location updating response message sent from the second core network device, where the second location updating response message includes the small data packet; and the processor is further configured to receive the second location updating response message sent from the target base station that serves the UE.

With reference to any one of the second to the fourth possible implementation manner of the ninth aspect. in a fifth possible implementation manner, the second paging message further includes RRC connection establishment waiting time, and the transmitter is further configured to send another RRC connection establishment request message to the target base station that serves the UE again when the RRC connection establishment waiting time expires before the RRC connection establishment message sent from the target base station that serves the UE is received; or, the transmitter is further configured to, after the RRC connection establishment request message is sent to the target base station that serves the UE, send another RRC connection establishment request message to the target base station that serves the UE again when set RRC connection establishment waiting time expires before the RRC connection establishment message sent from the target base station that serves the UE is received.

According to a seventh aspect, a core network device is provided, including: a processor and a memory, where the memory stores a computer executable instruction, and the processor is connected to the memory by using a communications bus; when the core network device runs, the processor executes the computer executable instruction stored in the memory, so that the core network device executes the foregoing method described in the second aspect.

By using the foregoing solutions, a base station that serves a UE acquires instruction information of a small data packet, and after receiving a radio resource control message sent from the UE, the base station that serves the UE acquires the small data packet from a core network device according to the instruction information of the small data packet, thereby avoiding a case in which in a small-data-packet transmission process, because the core network device delivers the small data packet directly to the base station that serves the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a base station may be a base station controller (BSC) in a 2G network, a radio network controller (RNC) in a 3G network, or an evolved NodeB (eNodeB) in an LTE network.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
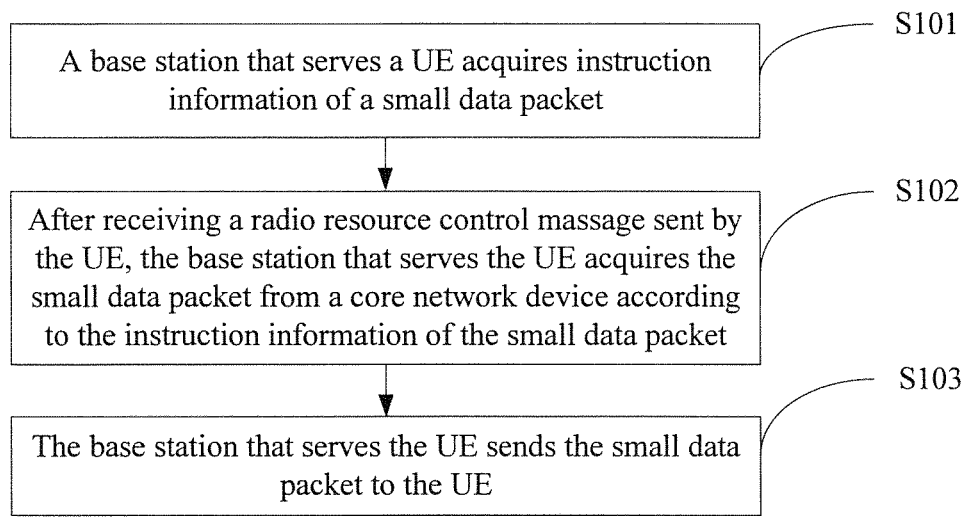
FIG. 1 is a schematic flowchart of a data packet transmission method according to an embodiment of the present invention.

As shown in FIG. 1, an embodiment of the present invention provides a data packet transmission method, and the method is executed by a base station that serves a UE.

S101. The base station that serves the UE acquires instruction information of a small data packet.

The base station that serves the UE is a base station in which a cell that is camped on by the UE is located, and the instruction information of the small data packet instructs the base station that serves the UE to transmit the small data packet.

Specifically, an MTC server sends the small data packet to a home subscriber server (HSS), and the HSS sends the small data packet to a core network device by using a machine type communication interworking function (MTC-IWF) entity, where the core network device may be an MME or a serving GPRS support node (SGSN), which is not limited in the present invention.

S102. After receiving a radio resource control message sent from the UE, the base station that serves the UE acquires the small data packet from a core network device according to the instruction information of the small data packet.

S103. The base station that serves the UE sends the small data packet to the UE.

In the foregoing steps S101 to S103, the base station that serves the UE acquires the instruction information of the small data packet; after receiving the radio resource control message sent from the UE, acquires the small data packet from the core network device according to the instruction information of the small data packet; and sends the small data packet to the UE. The foregoing steps S101 to S103 specifically include the following four cases.

Case 1: The base station that serves the UE receives a first paging message sent from the core network device, where the first paging message includes the instruction information of the small data packet.

After receiving an RRC connection establishment request message sent from the UE, the base station that serves the UE sends a paging response message to the core network device according to the instruction information of the small data packet, where the RRC connection establishment request message is the foregoing radio resource control message.

The base station that serves the UE receives the small data packet that is sent from the core network device according to the paging response message.

The base station that serves the UE sends an RRC connection establishment message to the UE, where the RRC connection establishment message includes the small data packet.

It should be noted that the foregoing base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Further, after the base station that serves the UE receives the first paging message sent from the core network device, the base station that serves the UE sends a second paging message to the UE, where the second paging message includes RRC connection establishment waiting time, and the RRC connection establishment waiting time is used for enabling the UE to send another RRC connection establishment request message to the base station that serves the UE again when the RRC connection establishment waiting time expires before the RRC connection establishment message sent from the base station that serves the UE is received. Certainly, the UE may also stop establishing an RRC connection.

For example, original establishment waiting time of the UE is two seconds, and the received RRC connection establishment waiting time is five seconds. When the RRC connection establishment waiting time (that is, five seconds) expires, the UE sends another RRC connection establishment request message to the base station that serves the UE again or stops establishing the RRC connection.

In another implementation manner of this embodiment of the present invention, after receiving RRC connection establishment waiting time, the UE may also add the RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station that serves the UE again or stops a process of establishing an RRC connection.

For example, original establishment waiting time of the UE is two seconds, and the received RRC connection establishment waiting time is three seconds. When the time (that is, five seconds) obtained after the RRC connection establishment waiting time is added to the original establishment waiting time expires, the UE sends another RRC connection establishment request message to the base station that serves the UE again or stops establishing the RRC connection.

Alternatively, the base station that serves the UE sends a second paging message to the UE, where the second paging message includes the instruction information of the small data packet, so that the UE sends another RRC connection establishment request message to the base station that serves the UE again when set RRC connection establishment waiting time expires before the small data packet sent from the base station that serves the UE is received.

Specifically, the RRC connection establishment waiting time is preset for the UE, and after receiving the instruction information of the small data packet, the UE starts a timer for timing.

For example, original establishment waiting time of the UE is two seconds, and the preset RRC connection establishment waiting time is five seconds. After receiving the instruction information of the small data packet, the UE performs timing according to the RRC connection establishment waiting time, and when the RRC connection establishment waiting time (that is, five seconds) expires, sends another RRC connection establishment request message to the base station that serves the UE again or stops establishing an RRC connection.

In another implementation manner of this embodiment of the present invention, after receiving the instruction information of the small data packet, the UE may also add preset RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station that serves the UE again or stops a process of establishing an RRC connection.

For example, original establishment waiting time of the UE is two seconds, and the preset RRC connection establishment waiting time is three seconds. When the time (that is, five seconds) obtained after the RRC connection establishment waiting time is added to the original establishment waiting time expires, the UE sends another RRC connection establishment request message to the base station that serves the UE again or stops establishing the RRC connection.

It should be noted that in this embodiment of the present invention, the RRC connection establishment waiting time may be sent to the UE by the base station that serves the UE. Or, the RRC connection establishment waiting time may also be sent to the UE by the core network device by using the base station that serves the UE, which is not limited in the present invention.

Case 2: Before the base station that serves the UE acquires the small data packet from the core network device according to the instruction information of the small data packet, when a current base station that serves the UE changes to the base station that serves the UE due to cell reselection, the base station that serves the UE receives an RRC connection establishment request message sent from the UE, where the RRC connection establishment request message includes the instruction information of the small data packet.

Specifically, the current base station that serves the UE receives a first paging message sent from the core network device and sends a second paging message to the UE; after receiving the second paging message, the UE sends the RRC connection establishment request message to the current base station that serves the UE; when the UE waits for an RRC connection establishment message, the cell reselection occurs, and a cell of the base station that serves the UE is selected, so that the UE sends the RRC connection establishment request message to the base station that serves the UE.

After receiving the RRC connection establishment request message sent from the UE, the base station that serves the UE sends a paging response message to the core network device according to the instruction information of the small data packet, where the RRC connection establishment request message is the foregoing radio resource control message.

The base station that serves the UE receives the small data packet that is sent from the core network device according to the paging response message.

The base station that serves the UE sends the RRC connection establishment message to the UE, where the RRC connection establishment message includes the small data packet.

It should be noted that the foregoing base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Further, the foregoing second paging message may include RRC connection establishment waiting time. For a specific description of the RRC connection establishment waiting time, reference may be made to the description of the RRC connection establishment waiting time in case 1, and details are not described herein again.

Case 3: Before the base station that serves the UE acquires the small data packet from the core network device according to the instruction information of the small data packet, a current base station that serves the UE changes to the base station that serves the UE due to cell reselection and a location area of the UE is updated, where the location area mainly includes a tracking area identity (TAI), a location area identity (LAI), and a routing area identity (RAI). A universal mobile telecommunications system (UMTS) cell has at least one TAI and RAI, and a long term evolution (LTE) cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

The base station that serves the UE receives an RRC connection establishment request message sent from the UE, where the RRC connection establishment request message includes the instruction information of the small data packet.

Specifically, the current base station that serves the UE receives a first paging message sent from the core network device and sends a second paging message to the UE, where the second paging message includes the instruction information of the small data packet; the UE sends the RRC connection establishment request message to the current base station that serves the UE according to the second paging message; when the UE waits for an RRC connection establishment message, the cell reselection occurs, and a cell of the base station that serves the UE is selected, so that the UE sends the RRC connection establishment request message to the base station that serves the UE, and after an RRC connection is established, the UE sends a first location update message to the base station that serves the UE.

After receiving the first location update message sent from the UE, the base station that serves the UE sends a second location update message to the core network device according to the first location update message, where the second location update message includes the instruction information of the small data packet, and the first location update message is the foregoing radio resource control message.

Specifically, after receiving the RRC connection establishment request message, the base station that serves the UE sends the RRC connection establishment message to the UE, and after receiving the RRC connection establishment message, the UE sends an RRC connection establishment complete message to the base station that serves the UE, thereby completing RRC connection establishment; after the RRC connection establishment is complete, the UE sends the first location update message to the base station that serves the UE, and after receiving the first location update message, the base station that serves the UE sends the second location update message to the core network device, so as to perform location update of the UE.

The base station that serves the UE receives a first location updating response message that is sent from the core network device according to the second location update message and sends the first location updating response message to the UE, where the first location updating response message includes the small data packet.

It should be noted that the foregoing base station that serves the UE may also receive the small data packet that is sent from the core network device by using another message, and the small data packet is not limited to being carried in the first location updating response message. However, to reduce signaling overheads and increase transmission efficiency of the small data packet, preferably, the first location updating response message carries the small data packet, so that the base station that serves the UE receives the small data packet by using the first location updating response message.

Likewise, the base station that serves the UE may also send the small data packet to the UE by using another message, and the small data packet is not limited to being carried in the first location updating response message. However, to reduce signaling overheads and increase transmission efficiency of the small data packet, preferably, the first location updating response message carries the small data packet, so that the base station that serves the UE sends the small data packet to the UE by using the first location updating response message.

Further, the foregoing second paging message may include RRC connection establishment waiting time. For a specific description of the RRC connection establishment waiting time, reference may be made to the description of the RRC connection establishment waiting time in case 1, and details are not described herein again.

Case 4: Before the base station that serves the UE acquires the small data packet from the core network device according to the instruction information of the small data packet, a current base station that serves the UE changes to the base station that serves the UE due to cell reselection; because of network deployment, the current base station that serves the UE corresponds to a first core network device, and the base station that serves the UE corresponds to a second core network device; and a location area of the UE is updated.

The base station that serves the UE receives an RRC connection establishment request message sent from the UE, where the RRC connection establishment request message includes the instruction information of the small data packet.

Specifically, the current base station that serves the UE receives a first paging message sent from the core network device and sends a second paging message to the UE, where the second paging message includes the instruction information of the small data packet; the UE sends the RRC connection establishment request message to the current base station that serves the UE according to the second paging message; when the UE waits for an RRC connection establishment message, the cell reselection occurs, and a cell of the base station that serves the UE is selected, so that the UE sends the RRC connection establishment request message to the base station that serves the UE, and after an RRC connection is established, the UE sends a first location update message to the base station that serves the UE.

After receiving the first location update message sent from the UE, the base station that serves the UE sends a second location update message to the second core network device according to the first location update message, where the second location update message includes the instruction information of the small data packet, so that the second core network device acquires the small data packet from the first core network device according to the instruction information of the small data packet. The first location update message is the foregoing radio resource control message.

Specifically, after receiving the second location update message, the second core network device sends a small-data-packet acquiring message to the first core network device according to the instruction information of the small data packet in the second location update message; after receiving the small-data-packet acquiring message, the first core network device sends the small data packet to the second core network device.

The base station that serves the UE receives a second location updating response message that is sent from the second core network device, and sends the second location updating response message that includes the small data packet to the UE, where the second location updating response message includes the small data packet.

It should be noted that the foregoing base station that serves the UE may also receive the small data packet that is sent from the second core network device by using another message, and the small data packet is not limited to being carried in the second location updating response message. However, to reduce signaling overheads and increase transmission efficiency of the small data packet, preferably, the second location updating response message carries the small data packet, so that the base station that serves the UE receives the small data packet by using the second location updating response message.

Likewise, the base station that serves the UE may also send the small data packet to the UE by using another message, and the small data packet is not limited to being carried in the second location updating response message. However, to reduce signaling overheads and increase transmission efficiency of the small data packet, preferably, the second location updating response message carries the small data packet, so that the base station that serves the UE sends the small data packet to the UE by using the second location updating response message.

Further, the foregoing second paging message may include RRC connection establishment waiting time. For a specific description of the RRC connection establishment waiting time, reference may be made to the description of the RRC connection establishment waiting time in case 1, and details are not described herein again.

It should be noted that in case 1 and case 2, after receiving the small data packet, the UE sends an RRC connection establishment complete message to the base station that serves the UE, where the RRC connection establishment complete message includes response information of receiving the small data packet; the base station that serves the UE sends the response information of receiving the small data packet to the core network device and releases the RRC connection, and the core network device sends the response information of receiving the small data packet to the MTC server by using an MTC-IWF entity.

In case 3 and case 4, after receiving the small data packet, the UE sends a location updating complete message to the base station that serves the UE, where the location updating complete message includes response information of receiving the small data packet; the base station that serves the UE sends the response information of receiving the small data packet to the core network device and releases the RRC connection, and the core network device sends the response information of receiving the small data packet to the MTC server by using an MTC-IWF entity.

By using the foregoing method executed by a base station that serves a UE, after receiving a radio resource control message sent from the UE, the base station that serves the UE acquires a small data packet from a core network device, thereby avoiding a case in which in a small-data-packet transmission process, because the core network device delivers the small data packet directly to the base station that serves the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

Figure 2:
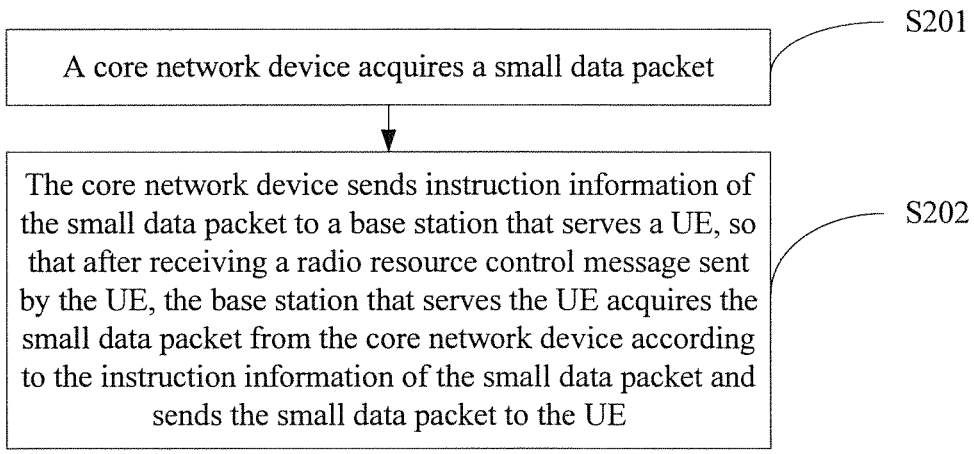
FIG. 2 is a schematic flowchart of another data packet transmission method according to another embodiment of the present invention.

As shown in FIG. 2, an embodiment of the present invention provides a data packet transmission method, and the method is executed by a core network device, where the core network device may be an MME or an SGSN, which is not limited in the present invention. The method includes the following steps.

S201. The core network device acquires a small data packet.

Specifically, an MTC server sends the small data packet to an HSS, and the HSS sends the small data packet to the core network device by using an MTC-IWF entity, where the core network device may be an MME or an SGSN, which is not limited in the present invention.

S202. The core network device sends instruction information of the small data packet to a base station that serves a UE, so that after receiving a radio resource control message sent from the UE, the base station that serves the UE acquires the small data packet from the core network device according to the instruction information of the small data packet and sends the small data packet to the UE.

The instruction information of the small data packet instructs the base station that serves the UE to transmit the small data packet.

The foregoing step S202 specifically includes the following four cases.

Case 1: The core network device sends a first paging message to the base station that serves the UE, where the first paging message includes the instruction information of the small data packet, so that after receiving an RRC connection establishment request message sent from the UE, the base station that serves the UE acquires the small data packet from the core network device according to the instruction information of the small data packet and sends an RRC connection establishment message to the UE, where the RRC connection establishment message includes the small data packet, and the RRC connection establishment message is the foregoing radio resource control message.

Specifically, the core network device sends the first paging message to the base station that serves the UE, so that the base station that serves the UE sends a second paging message to the UE, and the UE sends the RRC connection establishment request message to the base station that serves the UE according to the second paging message, where the first paging message includes the instruction information of the small data packet.

After the base station that serves the UE receives the RRC connection establishment request message sent from the UE, the core network device receives a paging response message that is sent from the base station that serves the UE according to the instruction information of the small data packet.

The core network device sends the small data packet to the base station that serves the UE according to the paging response message, so that the base station that serves the UE sends the RRC connection establishment message to the UE, where the RRC connection establishment message includes the small data packet.

It should be noted that the foregoing base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Further, the first paging message further includes RRC connection establishment waiting time, so that the base station that serves the UE sends the second paging message that includes the RRC connection establishment waiting time to the UE, where the RRC connection establishment waiting time is used for enabling the UE to send another RRC connection establishment request message to the base station that serves the UE again when the RRC connection establishment waiting time expires before the RRC connection establishment message sent from the base station that serves the UE is received. Certainly, the UE may also stop establishing an RRC connection.

For example, original establishment waiting time of the UE is two seconds, and the received RRC connection establishment waiting time is five seconds. When the RRC connection establishment waiting time (that is, five seconds) expires, the UE sends another RRC connection establishment request message to the base station that serves the UE again or stops establishing the RRC connection.

In another implementation manner of this embodiment of the present invention, after receiving RRC connection establishment waiting time, the UE may also add the RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station that serves the UE again or stops a process of establishing an RRC connection.

For example, original establishment waiting time of the UE is two seconds, and the received RRC connection establishment waiting time is three seconds. When the time (that is, five seconds) obtained after the RRC connection establishment waiting time is added to the original establishment waiting time expires, the UE sends another RRC connection establishment request message to the base station that serves the UE again or stops establishing the RRC connection.

Alternatively, a second paging message that is sent from the base station that serves the UE to the UE includes the instruction information of the small data packet, so that the UE sends another RRC connection establishment request message to the base station that serves the UE again when set RRC connection establishment waiting time expires before the RRC connection establishment message sent from the base station that serves the UE is received.

Specifically, the RRC connection establishment waiting time is preset for the UE, and after receiving the instruction information of the small data packet, the UE starts a timer for timing.

For example, original establishment waiting time of the UE is two seconds, and the preset RRC connection establishment waiting time is five seconds. After receiving the instruction information of the small data packet, the UE performs timing according to the RRC connection establishment waiting time, and when the RRC connection establishment waiting time (that is, five seconds) expires, sends the RRC connection establishment request message to the base station that serves the UE again or stops establishing an RRC connection.

In another implementation manner of this embodiment of the present invention, after receiving the instruction information of the small data packet, the UE may also add preset RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station that serves the UE again or stops a process of establishing an RRC connection.

For example, original establishment waiting time of the UE is two seconds, and the preset RRC connection establishment waiting time is three seconds. When the time (that is, five seconds) obtained after the RRC connection establishment waiting time is added to the original establishment waiting time expires, the UE sends another RRC connection establishment request message to the base station that serves the UE again or stops establishing the RRC connection.

It should be noted that in this embodiment of the present invention, the RRC connection establishment waiting time is sent to the UE by the core network device, and this embodiment of the present invention is not limited thereto. Or, the RRC connection establishment waiting time may also be sent to the UE by the base station that serves the UE, which is not limited in the present invention.

Case 2: Before the base station that serves the UE acquires the small data packet from the core network device according to the instruction information of the small data packet, when the base station that serves the UE changes from a current base station that serves the UE to a target base station that serves the UE due to cell reselection, the core network device sends a first paging message to the current base station that serves the UE, so that after receiving an RRC connection establishment request message sent from the UE, the current base station that serves the UE acquires the small data packet from the core network device according to the instruction information of the small data packet and sends an RRC connection establishment message to the UE, where the RRC connection establishment message includes the small data packet, and the RRC connection establishment message is the foregoing radio resource control message.

Specifically, the core network device sends the first paging message to the current base station that serves the UE, so that the current base station that serves the UE sends a second paging message to the UE; after receiving the second paging message, the UE sends the RRC connection establishment request message to the current base station that serves the UE; when the UE waits for the RRC connection establishment message, the cell reselection occurs, and a cell of the target base station that serves the UE is selected, so that the UE sends the RRC connection establishment request message to the target base station that serves the UE according to the second paging message, where the RRC connection establishment request message includes the instruction information of the small data packet.

After the target base station that serves the UE receives the RRC connection establishment request message sent from the UE, the core network device receives a paging response message that is sent from the target base station that serves the UE according to the instruction information of the small data packet.

The core network device sends the small data packet to the target base station that serves the UE according to the paging response message, and the target base station that serves the UE sends the RRC connection establishment message to the UE, where the RRC connection establishment message includes the small data packet.

It should be noted that the foregoing base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Further, the foregoing first paging message may include RRC connection establishment waiting time. For a specific description of the RRC connection establishment waiting time, reference may be made to the description of the RRC connection establishment waiting time in case 1, and details are not described herein again.

Case 3: Before the base station that serves the UE acquires the small data packet from the core network device according to the instruction information of the small data packet, the base station that serves the UE changes from a current base station that serves the UE to a target base station that serves the UE due to cell reselection, and a location area of the UE is updated.

The location area mainly includes a TAI, a LAI, and a RAI. A UMTS cell has at least one TAI and RAI, and an LTE cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

The core network device sends a first paging message to the current base station that serves the UE, so that the current base station that serves the UE sends a second paging message to the UE, and the UE sends an RRC connection establishment request message according to the second paging message, where the RRC connection establishment request message includes the instruction information of the small data packet; after receiving a first location update message sent from the UE, the target base station that serves the UE acquires the small data packet from the core network device according to the instruction information of the small data packet, receives a first location updating response message sent from the core network device, and sends the first location updating response message to the UE, where the first paging message and the second paging message include the instruction information of the small data packet, the first location updating response message includes the small data packet, and the first location update message is the foregoing radio resource control message.

Specifically, the UE sends the RRC connection establishment request message to the current base station that serves the UE according to the second paging message; when the UE waits for an RRC connection establishment message, the cell reselection occurs, and a cell of the target base station that serves the UE is selected, so that the UE sends the RRC connection establishment request to the target base station that serves the UE; after an RRC connection is established, the UE sends the first location update message to the target base station that serves the UE; after the target base station that serves the UE receives the first location update message sent from the UE, the core network device receives a second location update message sent from the target base station that serves the UE, where the second location update message includes the instruction information of the small data packet.

The core network device sends the first location updating response message to the target base station that serves the UE according to the instruction information of the small data packet, so that the target base station that serves the UE sends the first location updating response message to the UE, where the first location updating response message includes the small data packet.

It should be noted that the foregoing core network device may also send the small data packet to the target base station that serves the UE by using another message, and the small data packet is not limited to being carried in the first location updating response message. However, to reduce signaling overheads and increase transmission efficiency of the small data packet, preferably, the first location updating response message carries the small data packet, so that the target base station that serves the UE receives the small data packet by using the first location updating response message.

Likewise, the target base station that serves the UE may also send the small data packet to the UE by using another message, and the small data packet is not limited to being carried in the first location updating response message. However, to reduce signaling overheads and increase transmission efficiency of the small data packet, preferably, the first location updating response message carries the small data packet, so that the target base station that serves the UE sends the small data packet to the UE by using the first location updating response message.

Further, the foregoing first paging message may include RRC connection establishment waiting time. For a specific description of the RRC connection establishment waiting time, reference may be made to the description of the RRC connection establishment waiting time in case 1, and details are not described herein again.

Case 4: Before the base station that serves the UE acquires the small data packet from the core network device according to the instruction information of the small data packet, the base station that serves the UE changes from a current base station that serves the UE to a target base station that serves the UE due to cell reselection, the current base station that serves the UE corresponds to the core network device, the target base station that serves the UE corresponds to a second core network device, and a location area of the UE is updated.

The core network device sends a first paging message to the current base station that serves the UE, so that the current base station that serves the UE sends a second paging message to the UE, and the UE sends an RRC connection establishment request message to the target base station that serves the UE according to the second paging message, where the first paging message and the second paging message include the instruction information of the small data packet, and the RRC connection establishment request message includes the instruction information of the small data packet; after the target base station that serves the UE receives a first location update message sent from the UE, and the target base station that serves the UE sends a second location update message to the second core network device according to the first location update message, the second core network device acquires the small data packet from the core network device, and the base station that serves the UE receives a second location updating response message sent from the second core network device and sends the second location updating response message to the UE, where the second location update message includes the instruction information of the small data packet, and the second location updating response message includes the small data packet. The first location update message is the foregoing radio resource control message.

Specifically, the UE sends the RRC connection establishment request message to the current base station that serves the UE according to the second paging message; when the UE waits for an RRC connection establishment message, the cell reselection occurs, and a cell of the target base station that serves the UE is selected, so that the UE sends an RRC connection establishment request to the target base station that serves the UE; after an RRC connection is established, the UE sends the first location update message to the target base station that serves the UE; after the target base station that serves the UE receives the first location update message sent from the UE, and the target base station that serves the UE sends the second location update message to the second core network device according to the first location update message, the core network device receives a small-data-packet acquiring message that is sent from the second core network device according to the instruction information of the small data packet.

The core network device sends the small data packet to the second core network device according to the small-data-packet acquiring message, so that the second core network device sends the second location updating response message to the target base station that serves the UE, and the target base station that serves the UE sends the second location updating response message to the UE, where the second location updating response message includes the small data packet.

It should be noted that the foregoing base station that serves the UE may also receive the small data packet that is sent from the second core network device by using another message, and the small data packet is not limited to being carried in the second location updating response message. However, to reduce signaling overheads and increase transmission efficiency of the small data packet, preferably, the second location updating response message carries the small data packet, so that the base station that serves the UE receives the small data packet by using the second location updating response message.

Likewise, the target base station that serves the UE may also send the small data packet to the UE by using another message, and the small data packet is not limited to being carried in the second location updating response message. However, to reduce signaling overheads and increase transmission efficiency of the small data packet, preferably, the second location updating response message carries the small data packet, so that the target base station that serves the UE sends the small data packet to the UE by using the second location updating response message.

Further, the foregoing first paging message may include RRC connection establishment waiting time. For a specific description of the RRC connection establishment waiting time, reference may be made to the description of the RRC connection establishment waiting time in case 1, and details are not described herein again.

It should be noted that in case 1 and case 2, after receiving the small data packet, the UE sends an RRC connection establishment complete message to the base station that serves the UE, where the RRC connection establishment complete message includes response information of receiving the small data packet; the base station that serves the UE sends the response information of receiving the small data packet to the core network device and releases the RRC connection, and the core network device sends the response information of receiving the small data packet to the MTC server by using an MTC-IWF entity.

In case 3 and case 4, after receiving the small data packet, the UE sends a location updating complete message to the target base station that serves the UE, where the location updating complete message includes response information of receiving the small data packet, the target base station that serves the UE sends the response information of receiving the small data packet to the core network device and releases the RRC connection, and the core network device sends the response information of receiving the small data packet to the MTC server by using an MTC-IWF entity.

By using the foregoing method executed by a core network device, after acquiring a small data packet, the core network device sends instruction information of the small data packet to a base station that serves a UE, and after receiving a radio resource control message sent from the UE, the base station that serves the UE acquires the small data packet from the core network device, thereby avoiding a case in which in a small-data-packet transmission process, because the core network device delivers the small data packet directly to the base station that serves the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

Figure 3:
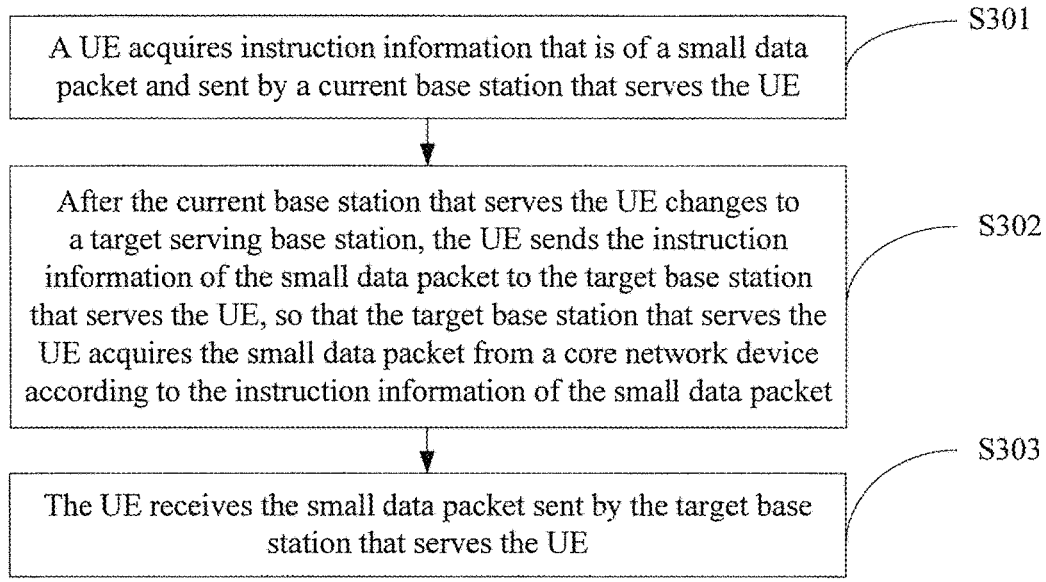
FIG. 3 is a schematic flowchart of another data packet transmission method according to still another embodiment of the present invention.

As shown in FIG. 3, an embodiment of the present invention provides a data packet transmission method, and the method is executed by a UE. The method includes the following steps.

S301. The UE acquires instruction information that is of a small data packet and sent from a current base station that serves the UE.

Specifically, after the current base station that serves the UE receives a first paging message sent from a core network device, the UE receives a second paging message sent from the current base station that serves the UE, where both the first paging message and the second paging message include the instruction information of the small data packet.

In a possible implementation manner of the present invention, an MTC server sends the small data packet to an HSS, and the HSS sends the small data packet to the core network device by using an MTC-IWF entity; the core network device sends the first paging message to the current base station that serves the UE, and after receiving the first paging message, the current base station that serves the UE sends the second paging message to the UE, where both the first paging message and the second paging message include the instruction information of the small data packet, the instruction information of the small data packet instructs a target base station that serves the UE to transmit the small data packet, and the core network device may be an MME or an SGSN, which is not limited in the present invention.

S302. After the current base station that serves the UE changes to a target base station that serves the UE, the UE sends the instruction information of the small data packet to the target base station that serves the UE, so that the target base station that serves the UE acquires the small data packet from a core network device according to the instruction information of the small data packet.

S303. The UE receives the small data packet sent from the target base station that serves the UE.

Specifically, the foregoing steps S302 and S303 specifically include the following three cases.

Case 1: The UE sends an RRC connection establishment request message to the target base station that serves the UE, where the RRC connection establishment request message includes the instruction information of the small data packet, so that the target base station that serves the UE sends a paging response message to the core network device according to instruction information of the small data packet and receives the small data packet that is sent from the core network device according to the paging response message, and the UE receives an RRC connection establishment message sent from the target base station that serves the UE, where the RRC connection establishment message includes the small data packet.

It should be noted that the foregoing target base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Case 2: A location area of the UE is updated, where the location area mainly includes a TAI, a LAI, and a RAI. A UMTS cell has at least one TAI and RAI, and an LTE cell has at least one TAI. When a cell camped on by the UE changes from one cell to another cell due to cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

The UE sends an RRC connection establishment request message to the target base station that serves the UE, where the RRC connection establishment request message includes the instruction information of the small data packet, so that after receiving a first location update message sent from the UE, the target base station that serves the UE sends a second location update message to the core network device according to the first location update message and receives a first location updating response message that is sent from the core network device according to the second location update message, and the UE receives the first location updating response message sent from the target base station that serves the UE, where the second location update message includes the instruction information of the small data packet, and the first location updating response message includes the small data packet.

Specifically, the current base station that serves the UE receives the first paging message sent from the core network device and sends the second paging message to the UE, where the second paging message includes the instruction information of the small data packet; the UE sends the RRC connection establishment request message to the current base station that serves the UE according to the second paging message; when the UE waits for an RRC connection establishment message, the cell reselection occurs, and a cell of the target base station that serves the UE is selected, so that the UE sends the RRC connection establishment request message to the target base station that serves the UE, the target base station that serves the UE sends the RRC connection establishment message to the UE, and after receiving the RRC connection establishment message, the UE sends an RRC connection establishment complete message to the base station that serves the UE, thereby completing RRC connection establishment; after the RRC connection establishment is complete, the UE sends the first location update message to the target base station that serves the UE, and after receiving the first location update message, the target base station that serves the UE sends the second location update message to the core network device, so as to perform location update of the UE.

It should be noted that the foregoing target base station that serves the UE may also receive the small data packet that is sent from the core network device by using another message, and the small data packet is not limited to being carried in the first location updating response message. However, to reduce signaling overheads and increase transmission efficiency of the small data packet, preferably, the first location updating response message carries the small data packet, so that the target base station that serves the UE receives the small data packet by using the first location updating response message.

Likewise, the target base station that serves the UE may also send the small data packet to the UE by using another message, and the small data packet is not limited to being carried in the first location updating response message. However, to reduce signaling overheads and increase transmission efficiency of the small data packet, preferably, the first location updating response message carries the small data packet, so that the target base station that serves the UE sends the small data packet to the UE by using the first location updating response message.

Case 3: When a location area of the UE is updated, and because of network deployment, the current base station that serves the UE corresponds to a first core network device, and the target base station that serves the UE corresponds to a second core network device, the UE sends an RRC connection establishment request message to the target base station that serves the UE, where the RRC connection establishment request message includes the instruction information of the small data packet, so that after receiving a first location update message sent from the UE, the target base station that serves the UE sends a second location update message to the second core network device according to the first location update message, where the second location update message includes the instruction information of the small data packet, so that the second core network device acquires the small data packet from the first core network device according to the instruction information of the small data packet, the target base station that serves the UE receives a second location updating response message sent from the second core network device, and the UE receives the second location updating response message sent from the target base station that serves the UE.

The second location updating response message includes the small data packet.

Specifically, the current base station that serves the UE receives the first paging message sent from the first core network device and sends the second paging message to the UE, where the second paging message includes the instruction information of the small data packet; the UE sends the RRC connection establishment request message to the current base station that serves the UE according to the second paging message; when the UE waits for an RRC connection establishment message, cell reselection occurs, and a cell of the target base station that serves the UE is selected, so that the UE sends the RRC connection establishment request message to the target base station that serves the UE; after an RRC connection is established, the UE sends the first location update message to the target base station that serves the UE.

It should be noted that the foregoing target base station that serves the UE may also receive the small data packet that is sent from the second core network device by using another message, and the small data packet is not limited to being carried in the second location updating response message. However, to reduce signaling overheads and increase transmission efficiency of the small data packet, preferably, the second location updating response message carries the small data packet, so that the target base station that serves the UE receives the small data packet by using the second location updating response message.

Likewise, the target base station that serves the UE may also send the small data packet to the UE by using another message, and the small data packet is not limited to being carried in the second location updating response message. However, to reduce signaling overheads and increase transmission efficiency of the small data packet, preferably, the second location updating response message carries the small data packet, so that the target base station that serves the UE sends the small data packet to the UE by using the second location updating response message.

Further, the second paging message further includes RRC connection establishment waiting time, where the RRC connection establishment waiting time is used for enabling the UE to send another RRC connection establishment request message to the target base station that serves the UE again when the RRC connection establishment waiting time expires before the RRC connection establishment message sent from the target base station that serves the UE is received. Certainly, the UE may also stop establishing the RRC connection.

For example, original establishment waiting time of the UE is two seconds, and the received RRC connection establishment waiting time is five seconds. When the RRC connection establishment waiting time (that is, five seconds) expires, the UE sends another RRC connection establishment request message to the target base station that serves the UE again or stops establishing the RRC connection.

In another implementation manner of this embodiment of the present invention, after receiving RRC connection establishment waiting time, the UE may also add the RRC connection establishment waiting time to original establishment waiting time. When time obtained after the RRC connection establishment waiting time is added to the original establishment waiting time expires before the RRC connection establishment message sent from the target base station that serves the UE is received, the UE sends another RRC connection establishment request message to the target base station that serves the UE again or stops a process of establishing the RRC connection.

For example, original establishment waiting time of the UE is two seconds, and the received RRC connection establishment waiting time is three seconds. When the time (that is, five seconds) obtained after the RRC connection establishment waiting time is added to the original establishment waiting time expires, the UE sends another RRC connection establishment request message to the target base station that serves the UE again or stops establishing the RRC connection.

Alternatively, after sending the RRC connection establishment request message to the target base station that serves the UE, the UE sends another RRC connection establishment request message to the target base station that serves the UE again when set RRC connection establishment waiting time expires before the RRC connection establishment message sent from the target base station that serves the UE is received.

Specifically, the RRC connection establishment waiting time is preset for the UE, and after receiving the instruction information of the small data packet, the UE starts a timer for timing.

For example, original establishment waiting time of the UE is two seconds, and the preset RRC connection establishment waiting time is five seconds. After receiving the instruction information of the small data packet, the UE performs timing according to the RRC connection establishment waiting time, and when the RRC connection establishment waiting time (that is, five seconds) expires, sends another RRC connection establishment request message to the target base station that serves the UE again or stops establishing the RRC connection.

By using the foregoing method executed by a UE, the UE receives instruction information that is of a small data packet and sent from a current base station that serves the UE, and after the current base station that serves the UE changes to a target base station that serves the UE, sends the instruction information of the small data packet to the target base station that serves the UE, so that the target base station that serves the UE acquires the small data packet from a core network device, thereby avoiding a case in which in a small-data-packet transmission process, because the core network device delivers the small data packet directly to the base station that serves the UE of the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

Figure 4:
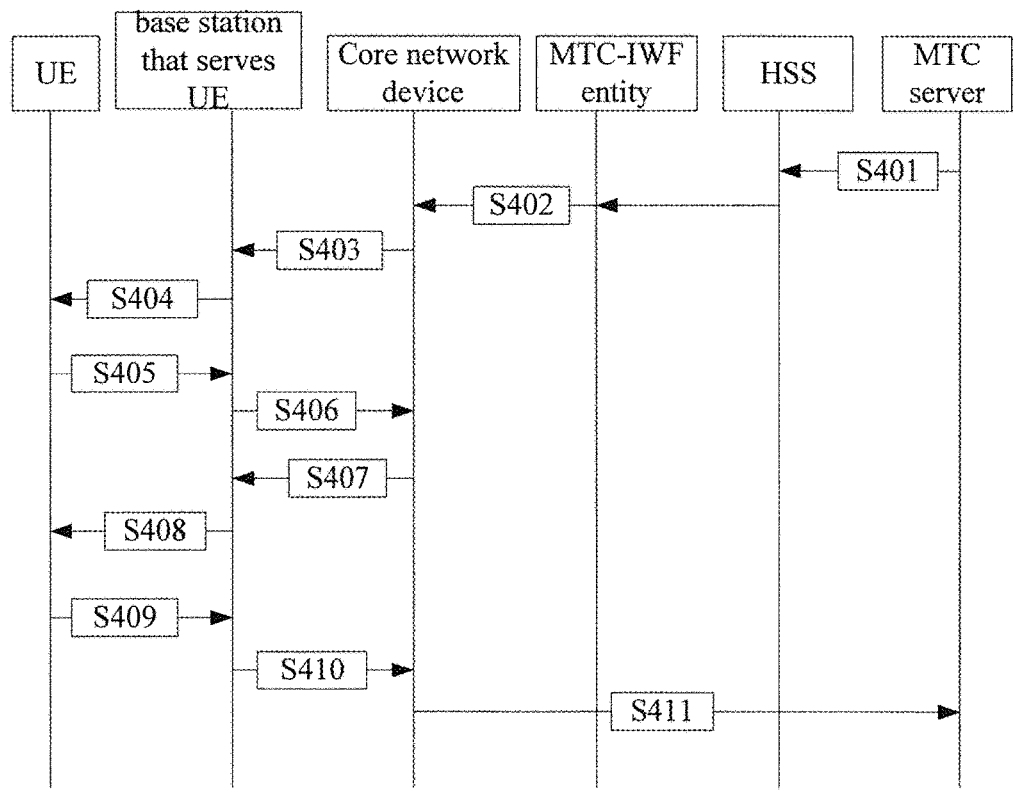
FIG. 4 is a schematic signaling diagram of a data packet transmission method according to still another embodiment of the present invention.

As shown in FIG. 4, an embodiment of the present invention provides a data packet transmission method.

S401. An MTC server sends a small data packet to an HSS.

S402. The HSS sends the small data packet to a core network device by using an MTC-IWF entity.

The core network device may be an MME or an SGSN.

S403. The core network device sends a first paging message to a base station that serves a UE.

The paging message includes instruction information of the small data packet, where the instruction information of the small data packet instructs the base station that serves the UE to transmit the small data packet.

S404. After receiving the first paging message, the base station that serves the UE sends a second paging message to the UE.

S405. The UE sends an RRC connection establishment request message to the base station that serves the UE according to the second paging message.

S406. After receiving the RRC connection establishment request message, the base station that serves the UE sends a paging response message to the core network device.

S407. The core network device sends the small data packet to the base station that serves the UE according to the paging response message.

S408. After receiving the small data packet, the base station that serves the UE sends the RRC connection establishment message to the UE.

The RRC connection establishment message includes the small data packet.

S409. After receiving the small data packet, the UE sends an RRC connection establishment complete message to the base station that serves the UE and releases an RRC connection.

The RRC connection establishment complete message includes response information of receiving the small data packet.

S410. The base station that serves the UE sends response information of receiving the small data packet to the core network device.

S411. The core network device sends the response information of receiving the small data packet to the MTC server by using the MTC-IWF entity.

By using the foregoing solution, a base station that serves a UE acquires instruction information of a small data packet, and after receiving an RRC connection establishment request message sent from the UE, the base station that serves the UE acquires the small data packet from a core network device according to the instruction information of the small data packet, thereby avoiding a case in which in a small-data-packet transmission process, because the core network device delivers the small data packet directly to the base station that serves the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

It should be noted that, for brevity, the foregoing method embodiment is described by using a combination of a series of actions. However, a person skilled in the art should know that the present invention is not limited by the sequence of the described actions; secondly, the person skilled in the art should also know that all embodiments described in the specification are exemplary embodiments, and actions and modules involved in the embodiments are not necessarily required in the present invention.

Figure 5:
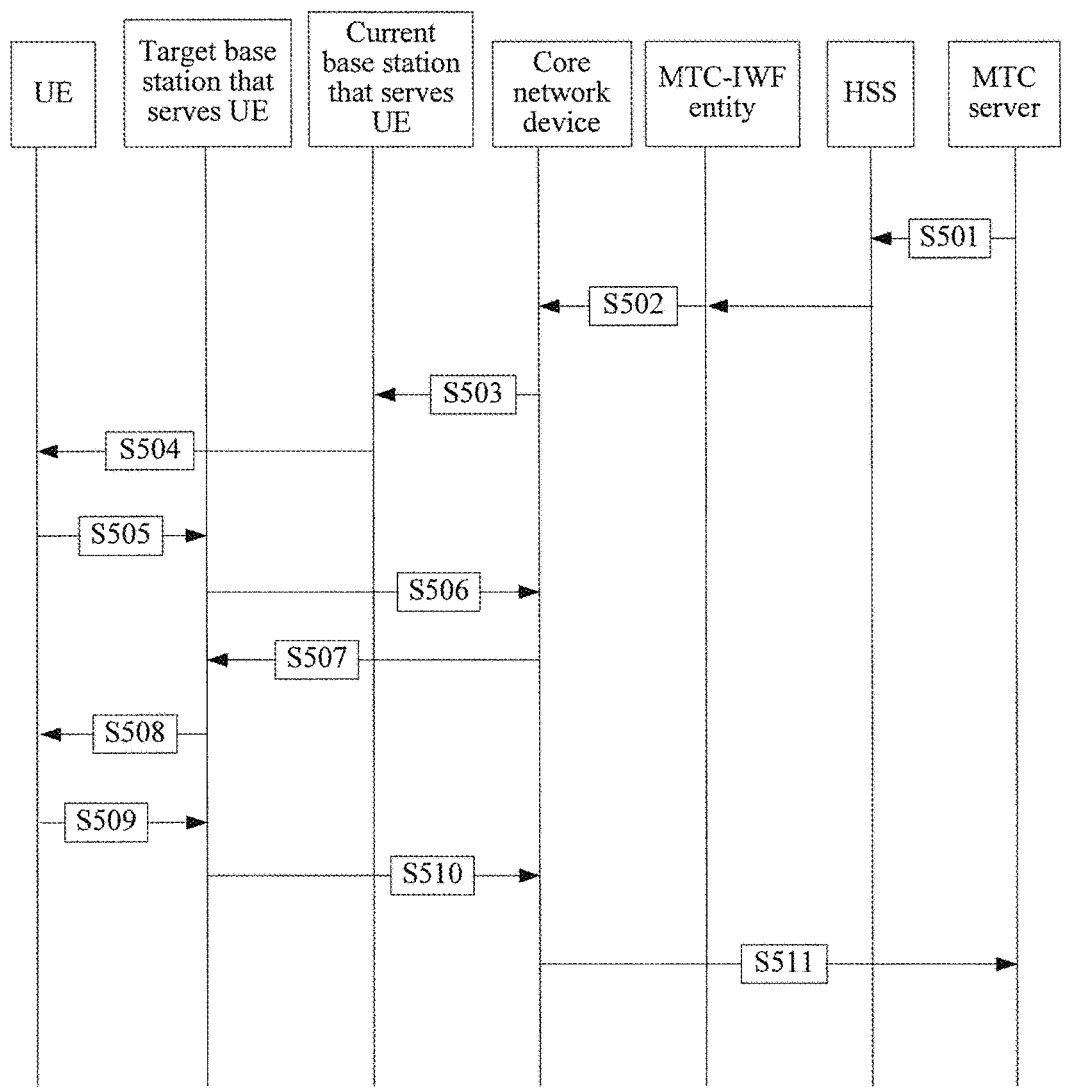
FIG. 5 is a schematic signaling diagram of another data packet transmission method according to still another embodiment of the present invention.

As shown in FIG. 5, an embodiment of the present invention provides a data packet transmission method, and this method embodiment is applied to a scenario in which a base station that serves a UE changes from a current base station that serves the UE to a target base station that serves the UE due to cell reselection.

S501. An MTC server sends a small data packet to an HSS.

S502. The HSS sends the small data packet to a core network device by using an MTC-IWF entity.

The core network device may be an MME or an SGSN.

S503. The core network device sends a first paging message to the current base station that serves the UE.

The paging message includes instruction information of the small data packet, where the instruction information of the small data packet instructs the base station that serves the UE to transmit the small data packet.

It should be noted that the core network device may also send the first paging message to the target base station that serves the UE.

S504. After receiving the first paging message, the current base station that serves the UE sends a second paging message to the UE.

Specifically, the UE sends an RRC connection establishment request message to the current base station that serves the UE according to the second paging message; when the UE waits for an RRC connection establishment message, when the base station that serves the UE changes from the current base station that serves the UE to the target base station that serves the UE due to the cell reselection of the UE, steps S505 to S511 are performed.

S505. The UE sends an RRC connection establishment request message to the target base station that serves the UE according to the second paging message.

The RRC connection establishment request message includes the instruction information of the small data packet.

It should be noted that when the foregoing target base station that serves the UE receives the first paging message that is sent from the core network device and includes the instruction information of the small data packet, the RRC connection establishment request message may not include the instruction information of the small data packet. For example, both the target base station that serves the UE and the current base station that serves the UE are within a paging area of the UE.

S506. After receiving the RRC connection establishment request message, the target base station that serves the UE sends a paging response message to the core network device.

S507. The core network device sends the small data packet to the target base station that serves the UE according to the paging response message.

S508. After receiving the small data packet, the target base station that serves the UE sends an RRC connection establishment message to the UE.

The RRC connection establishment message includes the small data packet.

S509. After receiving the small data packet, the UE sends an RRC connection establishment complete message to the target base station that serves the UE and releases an RRC connection.

The RRC connection establishment complete message includes response information of receiving the small data packet.

S510. The base station that serves the UE sends response information of receiving the small data packet to the core network device.

S511. The core network device sends the response information of receiving the small data packet to the MTC server by using the MTC-IWF entity.

By using the foregoing solution, in a scenario in which a base station that serves a UE changes from a current base station that serves the UE to a target base station that serves the UE due to cell reselection, the target base station that serves the UE acquires instruction information of a small data packet, and after receiving an RRC connection establishment request message sent from the UE, the target base station that serves the UE acquires the small data packet from a core network device according to the instruction information of the small data packet, thereby avoiding a case in which in a small-data-packet transmission process, because the core network device delivers the small data packet directly to the target base station that serves the UE, a storage burden is put on the target base station that serves the UE. In addition, the small data packet is temporarily stored in the core network device, so that when the core network device initiates paging, a storage burden of a non-base station that serves the UE is also reduced, and normal transmission of data is ensured.

It should be noted that, for brevity, the foregoing method embodiment is described by using a combination of a series of actions. However, a person skilled in the art should know that the present invention is not limited by the sequence of the described actions; secondly, the person skilled in the art should also know that all embodiments described in the specification are exemplary embodiments, and actions and modules involved in the embodiments are not necessarily required in the present invention.

Figure 6:
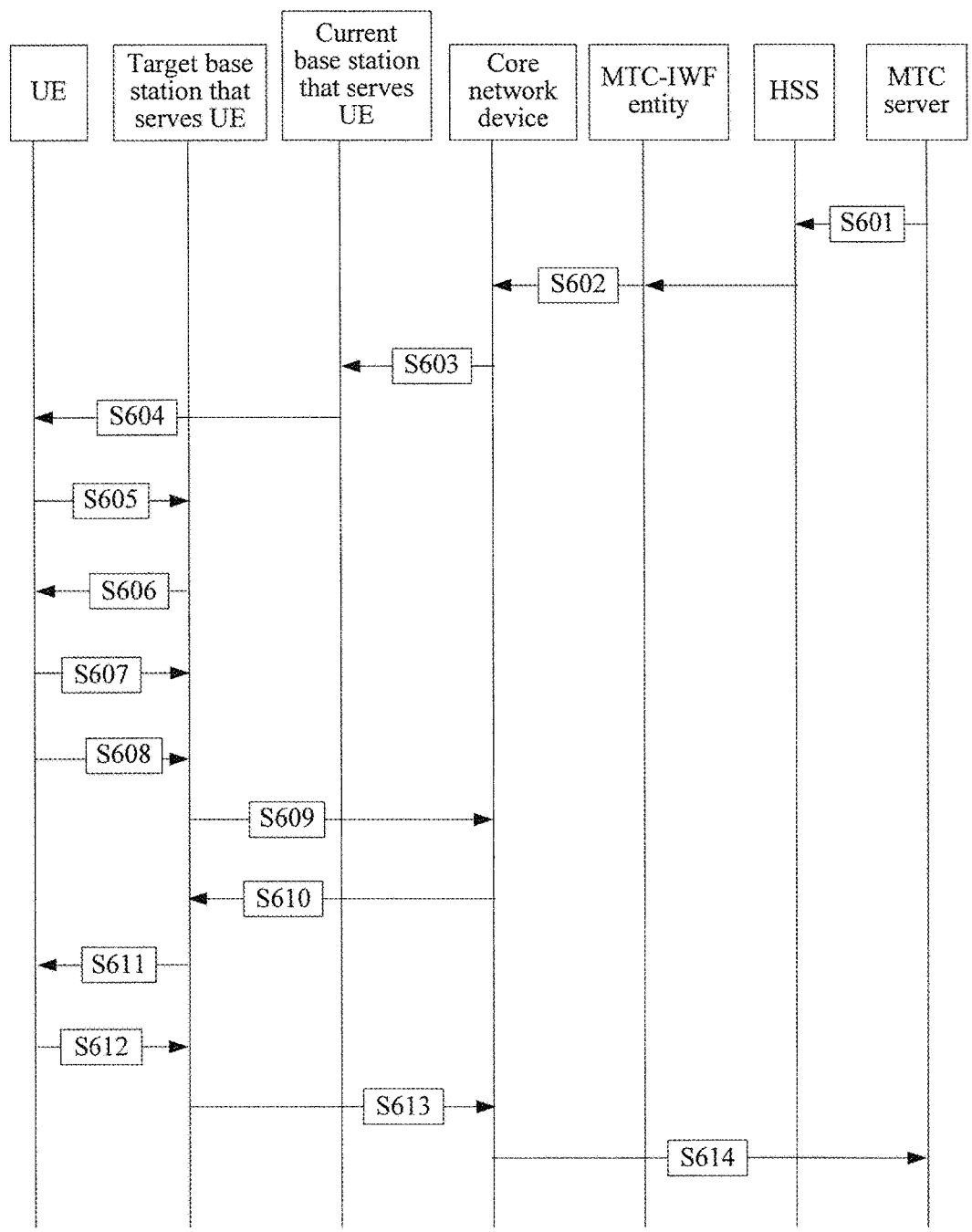
FIG. 6 is a schematic signaling diagram of another data packet transmission method according to still another embodiment of the present invention.

As shown in FIG. 6, an embodiment of the present invention provides a data packet transmission method, and this method embodiment is applied to a scenario in which a base station that serves a UE changes from a current base station that serves the UE to a target base station that serves the UE due to cell reselection and a location area of the UE is updated.

S601. An MTC server sends a small data packet to an HSS.

S602. The HSS sends the small data packet to a core network device by using an MTC-IWF entity.

The core network device may be an MME or an SGSN.

S603. The core network device sends a first paging message to the current base station that serves the UE.

The paging message includes instruction information of the small data packet, where the instruction information of the small data packet instructs the base station that serves the UE to transmit the small data packet.

It should be noted that the core network device may also send the first paging message to the target base station that serves the UE.

S604. After receiving the first paging message, the current base station that serves the UE sends a second paging message to the UE.

Specifically, the UE sends an RRC connection establishment request message to the current base station that serves the UE according to the second paging message; when the UE waits for an RRC connection establishment message, when the base station that serves the UE changes from the current base station that serves the UE to the target base station that serves the UE due to the cell reselection of the UE and the location area of the UE is updated, steps S605 to S614 are performed.

The location area mainly includes a TAI, a LAI, and a RAI. A UMTS cell has at least one TAI and RAI, and an LTE cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

S605. The UE sends an RRC connection establishment request message to the target base station that serves the UE according to the second paging message.

The RRC connection establishment request message includes the instruction information of the small data packet.

It should be noted that when the foregoing target base station that serves the UE receives the first paging message that is sent from the core network device and includes the instruction information of the small data packet, the RRC connection establishment request message may not include the instruction information of the small data packet. For example, both the target base station that serves the UE and the current base station that serves the UE are within a paging area of the UE.

S606. The target base station that serves the UE sends an RRC connection establishment message to the UE.

S607. The UE sends an RRC connection establishment complete message to the target base station that serves the UE.

S608. The UE sends a first location update message to the target base station that serves the UE.

S609. After receiving the first location update message, the target base station that serves the UE sends a second location update message to the core network device according to the first location update message.

The second location update message includes the instruction information of the small data packet.

S610. The core network device sends a location updating response message to the target base station that serves the UE according to the second location update message.

S611. The target base station that serves the UE sends the location updating response message to the UE.

The location updating response message includes the small data packet.

S612. After receiving the small data packet, the UE sends a location updating complete message to the target base station that serves the UE and releases an RRC connection.

The location updating complete message includes response information of receiving the small data packet.

S613. The target base station that serves the UE sends response information of receiving the small data packet to the core network device.

S614. The core network device sends the response information of receiving the small data packet to the MTC server by using the MTC-IWF entity.

By using the foregoing solution, in a scenario in which a base station that serves a UE changes from a current base station that serves the UE to a target base station that serves the UE due to cell reselection and a location area of the UE is updated, after receiving a first location update message sent from the UE, the target base station that serves the UE acquires a small data packet from a core network device, thereby avoiding a case in which in a small-data-packet transmission process, because the core network device delivers the small data packet directly to the target base station that serves the UE, a storage burden is put on the target base station that serves the UE. In addition, the small data packet is temporarily stored in the core network device, so that when the core network device initiates paging, a storage burden of a non-base station that serves the UE is also reduced, and normal transmission of data is ensured.

It should be noted that, for brevity, the foregoing method embodiment is described by using a combination of a series of actions. However, a person skilled in the art should know that the present invention is not limited by the sequence of the described actions; secondly, the person skilled in the art should also know that all embodiments described in the specification are exemplary embodiments, and actions and modules involved in the embodiments are not necessarily required in the present invention.

Figure 7:
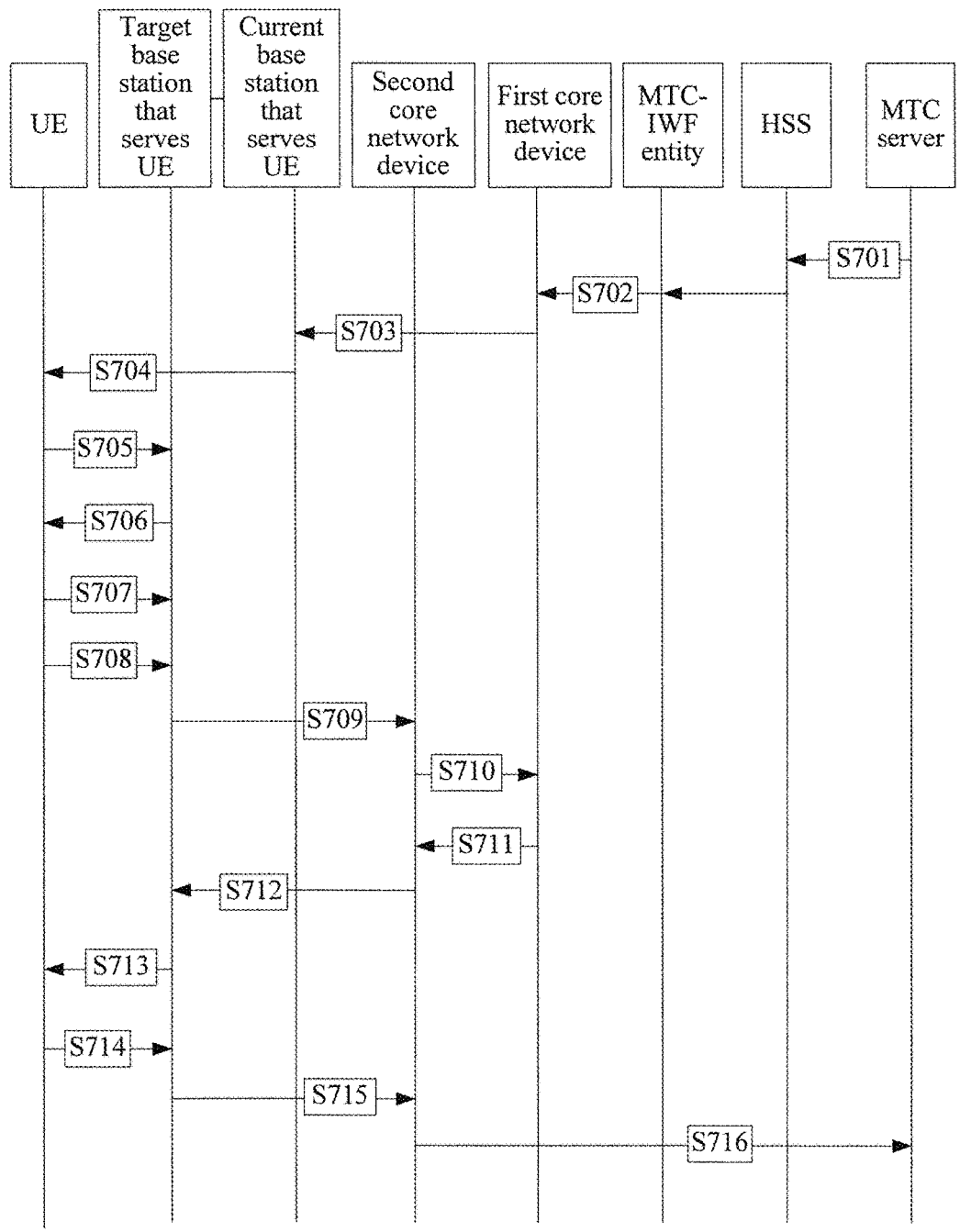
FIG. 7 is a schematic signaling diagram of another data packet transmission method according to still another embodiment of the present invention.

As shown in FIG. 7, an embodiment of the present invention provides a data packet transmission method, and this method embodiment is applied to a scenario in which a base station that serves a UE changes from a current base station that serves the UE to a target base station that serves the UE due to cell reselection, the current base station that serves the UE corresponds to a first core network device, the target base station that serves the UE corresponds to a second core network device, and a location area of the UE is updated.

S701. An MTC server sends a small data packet to an HSS.

S702. The HSS sends the small data packet to the first core network device by using an MTC-IWF entity.

The first core network device may be an MME or an SGSN.

S703. The first core network device sends a first paging message to the current base station that serves the UE.

The paging message includes instruction information of the small data packet, where the instruction information of the small data packet instructs the base station that serves the UE to transmit the small data packet.

It should be noted that the first core network device may also send the first paging message to the target base station that serves the UE.

S704. After receiving the first paging message, the current base station that serves the UE sends a second paging message to the UE.

Specifically, the UE sends an RRC connection establishment request message to the current base station that serves the UE according to the second paging message; when the UE waits for an RRC connection establishment message, when the base station that serves the UE changes from the current base station that serves the UE to the target base station that serves the UE due to the cell reselection of the UE, the current base station that serves the UE corresponds to the first core network device, the target base station that serves the UE corresponds to the second core network device, and the location area of the UE is updated, steps S705 to S716 are performed.

The location area mainly includes a TAI, a LAI, and a RAI. A UMTS cell has at least one TAI and RAI, and an LTE cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

S705. The UE sends an RRC connection establishment request message to the target base station that serves the UE according to the second paging message.

The RRC connection establishment request message includes the instruction information of the small data packet.

It should be noted that when the foregoing target base station that serves the UE receives the first paging message that is sent from the core network device and includes the instruction information of the small data packet, the RRC connection establishment request message may not include the instruction information of the small data packet. For example, both the target base station that serves the UE and the current base station that serves the UE are within a paging area of the UE.

S706. The target base station that serves the UE sends an RRC connection establishment message to the UE.

S707. The UE sends an RRC connection establishment complete message to the target base station that serves the UE.

S708. The UE sends a first location update message to the target base station that serves the UE.

S709. After receiving the first location update message, the target base station that serves the UE sends a second location update message to the second core network device according to the first location update message.

The second location update message includes the instruction information of the small data packet.

S710. After receiving the second location update message, the second core network device sends a small-data-packet acquiring message to the first core network device.

The second location update message includes the instruction information of the small data packet.

S711. The first core network device sends the small data packet to the second core network device according to the small-data-packet acquiring message.

S712. After receiving the small data packet, the first core network device sends a location updating response message to the target base station that serves the UE.

S713. The target base station that serves the UE sends the location updating response message to the UE.

The location updating response message includes the small data packet.

S714. After receiving the small data packet, the UE sends a location updating complete message to the target base station that serves the UE and releases an RRC connection.

The location updating complete message includes response information of receiving the small data packet.

S715. The target base station that serves the UE sends response information of receiving the small data packet to the second core network device.

S716. The second core network device sends the response information of receiving the small data packet to the MTC server by using the MTC-IWF entity.

By using the foregoing solution, in a scenario in which a base station that serves a UE changes from a current base station that serves the UE to a target base station that serves the UE due to cell reselection, the current base station that serves the UE corresponds to a first core network device, the target base station that serves the UE corresponds to a second core network device, and a location area of the UE is updated, after receiving a first location update message sent from the UE, the target base station that serves the UE acquires a small data packet from the second core network device, thereby avoiding a case in which in a small-data-packet transmission process, because the second core network device delivers the small data packet directly to the target base station that serves the UE, a storage burden is put on the target base station that serves the UE. In addition, the small data packet is temporarily stored in the second core network device, so that when the second core network device initiates paging, a storage burden of a non-base station that serves the UE is also reduced, and normal transmission of data is ensured.

It should be noted that, for brevity, the foregoing method embodiment is described by using a combination of a series of actions. However, a person skilled in the art should know that the present invention is not limited by the sequence of the described actions; secondly, the person skilled in the art should also know that all embodiments described in the specification are exemplary embodiments, and actions and modules involved in the embodiments are not necessarily required in the present invention.

Figure 8:
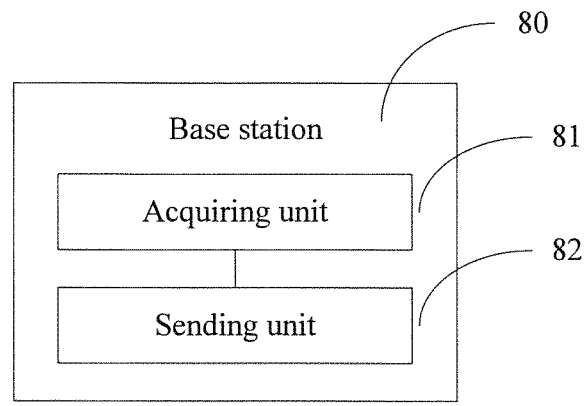
FIG. 8 is a schematic structural diagram of a base station according to still another embodiment of the present invention.

An embodiment of the present invention provides a base station 80, and as shown in FIG. 8, the base station 80 includes an acquiring unit 81 and a sending unit 82.

The acquiring unit 81 is configured to acquire instruction information of a small data packet, where the instruction information of the small data packet instructs a base station that serves a UE to transmit the small data packet; and after a radio resource control message sent from the UE is received, acquire the small data packet from a core network device according to the instruction information of the small data packet.

Specifically, an MTC server sends the small data packet to an HSS, and the HSS sends the small data packet to the core network device by using an MTC-IWF entity, where the core network device may be an MME or an SGSN, which is not limited in the present invention.

The sending unit 82 is configured to send the small data packet acquired by the acquiring unit 81 to the UE.

Optionally, the acquiring unit 81 is further configured to receive a first paging message sent from the core network device.

The first paging message includes the instruction information of the small data packet.

Optionally, the sending unit 82 is further configured to, after an RRC connection establishment request message sent from the UE is received, send a paging response message to the core network device according to the instruction information that is of the small data packet and acquired by the acquiring unit.

The acquiring unit 81 is further configured to receive the small data packet that is sent from the core network device according to the paging response message.

Optionally, the sending unit 82 is further configured to send an RRC connection establishment message to the UE, where the RRC connection establishment message includes the small data packet.

It should be noted that the foregoing sending unit may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Further, the sending unit 82 is further configured to, after the acquiring unit 81 receives the first paging message sent from the core network device, send a second paging message to the UE, where the second paging message includes RRC connection establishment waiting time, and the RRC connection establishment waiting time is used for enabling the UE to send another RRC connection establishment request message to the base station that serves the UE again when the RRC connection establishment waiting time expires before the RRC connection establishment message sent from the base station that serves the UE is received.

For example, original establishment waiting time of the UE is two seconds, and the received RRC connection establishment waiting time is five seconds. When the RRC connection establishment waiting time (that is, five seconds) expires, the UE sends another RRC connection establishment request message to the base station that serves the UE again or stops establishing an RRC connection.

In another implementation manner of this embodiment of the present invention, after receiving RRC connection establishment waiting time, the UE may also add the RRC connection establishment waiting time to original establishment waiting time. When time obtained after the RRC connection establishment waiting time is added to the original establishment waiting time expires before the RRC connection establishment message sent from the base station is received, the UE sends another RRC connection establishment request message to the base station again or stops a process of establishing an RRC connection.

For example, original establishment waiting time of the UE is two seconds, and the received RRC connection establishment waiting time is three seconds. When the time (that is, five seconds) obtained after the RRC connection establishment waiting time is added to the original establishment waiting time expires, the UE sends another RRC connection establishment request message to the base station again or stops establishing the RRC connection.

The sending unit 82 is further configured to, after the acquiring unit 81 receives the first paging message sent from the core network device, send a second paging message to the UE, where the second paging message includes the instruction information of the small data packet, so that the UE sends another RRC connection establishment request message to the base station again when set RRC connection establishment waiting time expires before the RRC connection establishment message sent from the base station is received.

Specifically, the RRC connection establishment waiting time is preset for the UE, and after receiving the instruction information of the small data packet, the UE starts a timer for timing.

For example, original establishment waiting time of the UE is two seconds, and the preset RRC connection establishment waiting time is five seconds. After receiving the instruction information of the small data packet, the UE performs timing according to the RRC connection establishment waiting time, and when the RRC connection establishment waiting time (that is, five seconds) expires, sends another RRC connection establishment request message to the base station again or stops establishing an RRC connection.

In another implementation manner of this embodiment of the present invention, after receiving the instruction information of the small data packet, the UE may also add preset RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station again or stops a process of establishing an RRC connection.

For example, original establishment waiting time of the UE is two seconds, and the preset RRC connection establishment waiting time is three seconds. When the time (that is, five seconds) obtained after the RRC connection establishment waiting time is added to the original establishment waiting time expires, the UE sends another RRC connection establishment request message to the base station again or stops establishing the RRC connection.

It should be noted that in this embodiment of the present invention, the RRC connection establishment waiting time is sent to the UE by the base station, and this embodiment of the present invention is not limited thereto. The RRC connection establishment waiting time may also be sent to the UE by the core network device by using the base station, which is not limited in the present invention.

Optionally, the acquiring unit 81 is further configured to, when a current base station that serves the UE changes to the base station, receive the RRC connection establishment request message sent from the UE.

The RRC connection establishment request message includes the instruction information of the small data packet.

Specifically, the current base station that serves the UE receives the first paging message sent from the core network device, and sends the second paging message to the UE; after receiving the second paging message, the UE sends the RRC connection establishment request message to the current base station that serves the UE; when the UE waits for the RRC connection establishment message, cell reselection occurs, and a cell of the base station is selected, so that the UE sends the RRC connection establishment request message to the base station.

The sending unit 82 is further configured to, after the acquiring unit 81 receives the RRC connection establishment request message sent from the UE, send a paging response message to the core network device according to the instruction information that is of the small data packet and acquired by the acquiring unit.

The acquiring unit 81 is further configured to receive the small data packet that is sent from the core network device according to the paging response message.

The sending unit 82 is further configured to send the RRC connection establishment message to the UE, where the RRC connection establishment message includes the small data packet.

It should be noted that the foregoing sending unit 82 may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Optionally, the acquiring unit 81 is further configured to, when a current base station that serves the UE changes to the base station and a location area of the UE is updated, receive the RRC connection establishment request message sent from the UE, where the RRC connection establishment request message includes the instruction information of the small data packet.

The location area mainly includes a TAI, a LAI, and a RAI. A UMTS cell has at least one TAI and RAI, and an LTE cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

Specifically, the current base station that serves the UE receives the first paging message sent from the core network device and sends the second paging message to the UE, where the second paging message includes the instruction information of the small data packet; the UE sends the RRC connection establishment request message to the current base station that serves the UE according to the second paging message; when the UE waits for the RRC connection establishment message, the cell reselection occurs, and a cell of the base station is selected, so that the UE sends the RRC connection establishment request message to the base station, and after an RRC connection is established, the UE sends a first location update message to the base station.

The sending unit 82 is further configured to, after the acquiring unit 81 receives the first location update message sent from the UE, send a second location update message to the core network device according to the first location update message received by the acquiring unit 81, where the second location update message includes the instruction information of the small data packet.

Specifically, after receiving the RRC connection establishment request message, the base station sends the RRC connection establishment message to the UE, and after receiving the RRC connection establishment message, the UE sends an RRC connection establishment complete message to the base station, so as to complete RRC connection establishment; after the RRC connection establishment is complete, the UE sends the first location update message to the base station, and after receiving the first location update message, the base station sends the second location update message to the core network device, so as to perform location update of the UE.

The acquiring unit 81 is further configured to receive a first location updating response message that is sent from the core network device according to the second location update message, where the first location updating response message includes the small data packet.

The sending unit 82 is further configured to send the first location updating response message to the UE.

It should be noted that the foregoing base station may also receive the small data packet that is sent from the core network device by using another message, and the small data packet is not limited to being carried in the first location updating response message. However, to reduce signaling overheads and increase transmission efficiency of the small data packet, preferably, the first location updating response message carries the small data packet, so that the base station receives the small data packet by using the first location updating response message.

Likewise, the base station may also send the small data packet to the UE by using another message, and the small data packet is not limited to being carried in the first location updating response message. However, to reduce signaling overheads and increase transmission efficiency of the small data packet, preferably, the first location updating response message carries the small data packet, so that the base station sends the small data packet to the UE by using the first location updating response message.

Optionally, the acquiring unit 81 is further configured to, when a current base station that serves the UE changes to the base station; because of network deployment, the current base station that serves the UE corresponds to a first core network device, and the base station corresponds to a second core network device; and a location area of the UE is updated, receive the RRC connection establishment request message sent from the UE, where the RRC connection establishment request message includes the instruction information of the small data packet.

Specifically, the current base station that serves the UE receives the first paging message sent from the core network device and sends the second paging message to the UE, where the second paging message includes the instruction information of the small data packet; the UE sends the RRC connection establishment request message to the current base station that serves the UE according to the second paging message; when the UE waits for the RRC connection establishment message, the cell reselection occurs, and a cell of the base station is selected, so that the UE sends an RRC connection establishment request to the base station, and after an RRC connection is established, the UE sends a first location update message to the base station.

The sending unit 82 is further configured to, after the acquiring unit 81 receives the radio resource control message sent from the UE, send a second location update message to the second core network device according to the first location update message, where the second location update message includes the instruction information of the small data packet, so that the second core network device acquires the small data packet from the first core network device according to the instruction information of the small data packet.

Specifically, after receiving the second location update message, the second core network device sends a small-data-packet acquiring message to the first core network device according to the instruction information of the small data packet in the second location update message; after receiving the small-data-packet acquiring message, the first core network device sends the small data packet to the second core network device.

The acquiring unit 81 is further configured to receive a second location updating response message sent from the second core network device, where the second location updating response message includes the small data packet.

The sending unit 82 is further configured to send the second location updating response message that includes the small data packet to the UE.

It should be noted that the foregoing base station may also receive the small data packet that is sent from the second core network device by using another message, and the small data packet is not limited to being carried in the second location updating response message. However, to reduce signaling overheads and increase transmission efficiency of the small data packet, preferably, the second location updating response message carries the small data packet, so that the base station receives the small data packet by using the second location updating response message.

Likewise, the base station may also send the small data packet to the UE by using another message, and the small data packet is not limited to being carried in the second location updating response message. However, to reduce signaling overheads and increase transmission efficiency of the small data packet, preferably, the second location updating response message carries the small data packet, so that the base station sends the small data packet to the UE by using the second location updating response message.

By using the foregoing base station, after receiving a radio resource control message sent from a UE, the base station acquires a small data packet from a core network device, thereby avoiding a case in which in a small-data-packet transmission process, because the core network device delivers the small data packet directly to the base station, a storage burden is put on a base station that serves the UE. In addition, the small data packet is temporarily stored in the core network device, so that when the core network device initiates paging, a storage burden of a non-base station that serves the UE is also reduced, and normal transmission of data is ensured.

It may be clearly understood by a person skilled in the art that, for the purpose of convenient and brief description, for a specific description of a working process of the base station described above, reference may be made to a corresponding process in the foregoing method embodiment in FIG. 1, and details are not described herein again.

Figure 9:
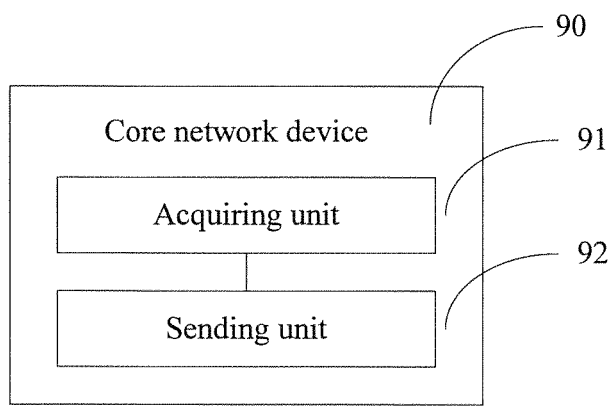
FIG. 9 is a schematic structural diagram of a core network device according to still another embodiment of the present invention.

An embodiment of the present invention provides a core network device 90. For example, the core network device 90 may be an MME or an SGSN. As shown in FIG. 9, the core network device 90 includes an acquiring unit 91 and a sending unit 92. The acquiring unit 91 is configured to acquire a small data packet.

Specifically, an MTC server sends the small data packet to an HSS, and the HSS sends the small data packet to the core network device by using an MTC-IWF entity, where the core network device may be an MME or an SGSN, which is not limited in the present invention.

The sending unit 92 is configured to send instruction information of the small data packet to a base station that serves a UE, so that after receiving a radio resource control message sent from the UE, the base station that serves the UE acquires the small data packet from the core network device according to the instruction information of the small data packet and sends the small data packet to the UE.

The instruction information of the small data packet instructs the base station that serves the UE to transmit the small data packet.

Optionally, the sending unit 92 is further configured to send a first paging message to the base station that serves the UE, where the first paging message includes the instruction information of the small data packet, so that after receiving an RRC connection establishment request message sent from the UE, the base station that serves the UE acquires the small data packet from the core network device according to the instruction information of the small data packet and sends an RRC connection establishment message to the UE, where the RRC connection establishment message includes the small data packet.

Specifically, the core network device sends the first paging message to the base station that serves the UE, so that the base station that serves the UE sends a second paging message to the UE, and the UE sends the RRC connection establishment request message to the base station that serves the UE according to the second paging message.

The first paging message includes the instruction information of the small data packet.

After the base station that serves the UE receives the RRC connection establishment request message sent from the UE, the core network device receives a paging response message that is sent from the base station that serves the UE according to the instruction information of the small data packet.

The core network device sends the small data packet to the base station that serves the UE according to the paging response message, so that the base station that serves the UE sends the RRC connection establishment message to the UE, where the RRC connection establishment message includes the small data packet.

It should be noted that the foregoing base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Further, the first paging message further includes RRC connection establishment waiting time, so that the base station that serves the UE sends the second paging message that includes the RRC connection establishment waiting time to the UE, where the RRC connection establishment waiting time is used for enabling the UE to send another RRC connection establishment request message to the base station that serves the UE again when the RRC connection establishment waiting time expires before the RRC connection establishment message sent from the base station that serves the UE is received.

For example, original establishment waiting time of the UE is two seconds, and the received RRC connection establishment waiting time is five seconds. When the RRC connection establishment waiting time (that is, five seconds) expires, the UE sends another RRC connection establishment request message to the base station that serves the UE again or stops establishing an RRC connection.

In another implementation manner of this embodiment of the present invention, after receiving RRC connection establishment waiting time, the UE may also add the RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station that serves the UE again or stops a process of establishing an RRC connection.

For example, original establishment waiting time of the UE is two seconds, and the received RRC connection establishment waiting time is three seconds. When the time (that is, five seconds) obtained after the RRC connection establishment waiting time is added to the original establishment waiting time expires, the UE sends another RRC connection establishment request message to the base station that serves the UE again or stops establishing the RRC connection.

Alternatively, a second paging message that is sent from the base station that serves the UE to the UE includes the instruction information of the small data packet, so that the UE sends another RRC connection establishment request message to the base station that serves the UE again when set RRC connection establishment waiting time expires before the RRC connection establishment message sent from the base station that serves the UE is received.

Specifically, the RRC connection establishment waiting time is preset for the UE, and after receiving the instruction information of the small data packet, the UE starts a timer for timing.

For example, original establishment waiting time of the UE is two seconds, and the preset RRC connection establishment waiting time is five seconds. After receiving the instruction information of the small data packet, the UE performs timing according to the RRC connection establishment waiting time, and when the RRC connection establishment waiting time (that is, five seconds) expires, sends the RRC connection establishment request message to the base station that serves the UE again or stops establishing an RRC connection.

In another implementation manner of this embodiment of the present invention, after receiving the instruction information of the small data packet, the UE may also add preset RRC connection establishment waiting time to original establishment waiting time. When time obtained after the RRC connection establishment waiting time is added to the original establishment waiting time expires before the RRC connection establishment message sent from the base station that serves the UE is received, the UE sends another RRC connection establishment request message to the base station that serves the UE again or stops a process of establishing an RRC connection.

For example, original establishment waiting time of the UE is two seconds, and the preset RRC connection establishment waiting time is three seconds. When the time (that is, five seconds) obtained after the RRC connection establishment waiting time is added to the original establishment waiting time expires, the UE sends another RRC connection establishment request message to the base station that serves the UE again or stops establishing the RRC connection.

It should be noted that in this embodiment of the present invention, the RRC connection establishment waiting time is sent to the UE by the core network device, and this embodiment of the present invention is not limited thereto. The RRC connection establishment waiting time may also be sent to the UE by the base station that serves the UE, which is not limited in the present invention.

Optionally, the sending unit 92 is further configured to, when the base station that serves the UE changes from a current base station that serves the UE to a target base station that serves the UE, send a first paging message to the current base station that serves the UE, so that the current base station that serves the UE sends a second paging message to the UE, and after receiving an RRC connection establishment request message that is sent from the UE according to the second paging message, the target base station that serves the UE acquires the small data packet from the core network device according to the instruction information that is of the small data packet and included in the RRC connection establishment request message, and sends an RRC connection establishment message to the UE, where the first paging message and the second paging message include the instruction information of the small data packet, and the RRC connection establishment message includes the small data packet.

Specifically, the core network device sends the first paging message to the current base station that serves the UE, so that the current base station that serves the UE sends the second paging message to the UE; after receiving the second paging message, the UE sends the RRC connection establishment request message to the current base station that serves the UE; when the UE waits for the RRC connection establishment message, cell reselection occurs, and a cell of the target base station that serves the UE is selected, so that the UE sends the RRC connection establishment request message to the target base station that serves the UE according to the second paging message, where the RRC connection establishment request message includes the instruction information of the small data packet.

After the target base station that serves the UE receives the RRC connection establishment request message sent from the UE, the core network device receives a paging response message that is sent from the target base station that serves the UE according to the instruction information of the small data packet.

The core network device sends the small data packet to the target base station that serves the UE according to the paging response message, and the target base station that serves the UE sends the RRC connection establishment message to the UE, where the RRC connection establishment message includes the small data packet.

It should be noted that the foregoing base station that serves the UE may also send the small data packet to the UE by using another message, and the small data packet is not limited to being carried in the RRC connection establishment message. However, to reduce signaling overheads and increase transmission efficiency of the small data packet, preferably, the RRC connection establishment message includes the small data packet, so that the small data packet is sent to the UE by using the RRC connection establishment message.

Optionally, the sending unit 92 is further configured to, when the base station that serves the UE changes from a current base station that serves the UE to a target base station that serves the UE and a location area of the UE is updated, send a first paging message to the current base station that serves the UE, so that the current base station that serves the UE sends a second paging message to the UE, and the UE sends an RRC connection establishment request message to the target base station that serves the UE according to the second paging message, where the RRC connection establishment request message includes the instruction information of the small data packet; after receiving a first location update message sent from the UE, the target base station that serves the UE acquires the small data packet from the core network device according to the instruction information of the small data packet, receives a first location updating response message sent from the core network device, and sends the first location updating response message to the UE, where the first paging message and the second paging message include the instruction information of the small data packet, and the first location updating response message includes the small data packet.

The location area mainly includes a TAI, a LAI, and a RAI. A UMTS cell has at least one TAI and RAI, and an LTE cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

Specifically, the UE sends the RRC connection establishment request message to the current base station that serves the UE according to the second paging message; when the UE waits for an RRC connection establishment message, the cell reselection occurs, and a cell of the target base station that serves the UE is selected, so that the UE sends an RRC connection establishment request to the target base station that serves the UE; after an RRC connection is established, the UE sends the first location update message to the target base station that serves the UE; after the target base station that serves the UE receives the first location update message sent from the UE, the core network device receives a second location update message sent from the target base station that serves the UE, where the second location update message includes the instruction information of the small data packet.

The core network device sends the first location updating response message to the target base station that serves the UE according to the instruction information of the small data packet, so that the target base station that serves the UE sends the first location updating response message to the UE.

The first location updating response message includes the small data packet.

It should be noted that the foregoing core network device may also send the small data packet to the target base station that serves the UE by using another message, and the small data packet is not limited to being carried in the first location updating response message. However, to reduce signaling overheads and increase transmission efficiency of the small data packet, preferably, the first location updating response message carries the small data packet, so that the target base station that serves the UE receives the small data packet by using the first location updating response message.

Likewise, the target base station that serves the UE may also send the small data packet to the UE by using another message, and the small data packet is not limited to being carried in the first location updating response message. However, to reduce signaling overheads and increase transmission efficiency of the small data packet, preferably, the first location updating response message carries the small data packet, so that the target base station that serves the UE sends the small data packet to the UE by using the first location updating response message.

Optionally, the sending unit 92 is further configured to, when the base station that serves the UE changes from a current base station that serves the UE to a target base station that serves the UE, the current base station that serves the UE corresponds to the core network device, the target base station that serves the UE corresponds to a second core network device, and a location area of the UE is updated, send a first paging message to the current base station that serves the UE, so that the current base station that serves the UE sends a second paging message to the UE, and the UE sends an RRC connection establishment request message to the target base station that serves the UE according to the second paging message, where the first paging message and the second paging message include the instruction information of the small data packet, and the RRC connection establishment request message includes the instruction information of the small data packet; after the target base station that serves the UE receives a first location update message sent from the UE, and the target base station that serves the UE sends a second location update message to the second core network device according to the first location update message, the second core network device acquires the small data packet from the core network device, and the base station that serves the UE receives a second location updating response message sent from the second core network device, and sends the second location updating response message to the UE, where the second location update message includes the instruction information of the small data packet, and the second location updating response message includes the small data packet.

Specifically, the UE sends the RRC connection establishment request message to the current base station that serves the UE according to the second paging message; when the UE waits for an RRC connection establishment message, the cell reselection occurs, and a cell of the target base station that serves the UE is selected, so that the UE sends an RRC connection establishment request to the target base station that serves the UE; after an RRC connection is established, the UE sends the first location update message to the target base station that serves the UE; after the target base station that serves the UE receives the first location update message sent from the UE, and the target base station that serves the UE sends the second location update message to the second core network device according to the first location update message, the core network device receives a small-data-packet acquiring message that is sent from the second core network device according to the instruction information of the small data packet.

The core network device sends the small data packet to the second core network device according to the small-data-packet acquiring message, so that the second core network device sends the second location updating response message to the target base station that serves the UE, and the target base station that serves the UE sends the second location updating response message to the UE, where the second location updating response message includes the small data packet.

It should be noted that the foregoing base station that serves the UE may also receive the small data packet that is sent from the second core network device by using another message, and the small data packet is not limited to being carried in the second location updating response message. However, to reduce signaling overheads and increase transmission efficiency of the small data packet, preferably, the second location updating response message carries the small data packet, so that the base station that serves the UE receives the small data packet by using the second location updating response message.

Likewise, the target base station that serves the UE may also send the small data packet to the UE by using another message, and the small data packet is not limited to being carried in the second location updating response message. However, to reduce signaling overheads and increase transmission efficiency of the small data packet, preferably, the second location updating response message carries the small data packet, so that the target base station that serves the UE sends the small data packet to the UE by using the second location updating response message.

By using the foregoing core network device, after acquiring a small data packet, the core network device sends instruction information of the small data packet to a base station that serves a UE; after receiving a radio resource control message sent from the UE, the base station that serves the UE acquires the small data packet from the core network device, thereby avoiding a case in which in a small-data-packet transmission process, because the core network device delivers the small data packet directly to the base station that serves the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

It may be clearly understood by a person skilled in the art that, for the purpose of convenient and brief description, for a specific description of a working process of the core network device described above, reference may be made to a corresponding process in the foregoing method embodiment in FIG. 2, and details are not described herein again.

Figure 10:
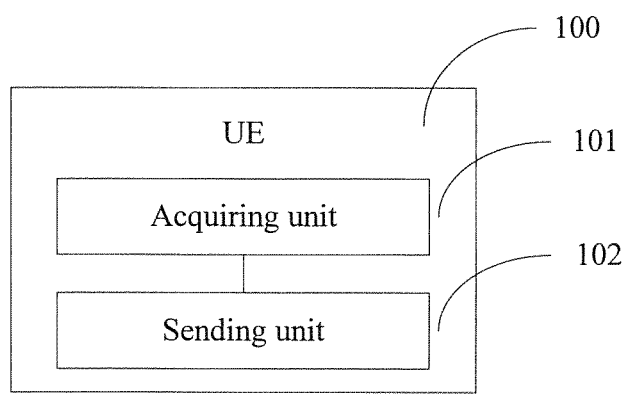
FIG. 10 is a schematic structural diagram of a UE according to still another embodiment of the present invention.

An embodiment of the present invention provides a UE 100, and as shown in FIG. 10, including an acquiring unit 101 and a sending unit 102.

The acquiring unit 101 is configured to acquire instruction information that is of a small data packet and sent from a current base station that serves the UE.

The instruction information of the small data packet instructs a target base station that serves the UE to transmit the small data packet.

Specifically, the acquiring unit 101 is further configured to, after the current base station that serves the UE receives a first paging message sent from a core network device, receive a second paging message sent from the current base station that serves the UE.

Both the first paging message and the second paging message include the instruction information of the small data packet.

In a possible implementation manner of the present invention, an MTC server sends the small data packet to an HSS, and the HSS sends the small data packet to the core network device by using an MTC-IWF entity; the core network device sends the first paging message to the current base station that serves the UE, and after receiving the first paging message, the current base station that serves the UE sends the second paging message to the UE, where both the first paging message and the second paging message include the instruction information of the small data packet, the instruction information of the small data packet instructs a target base station that serves the UE to transmit the small data packet, and the core network device may be an MME or an SGSN, which is not limited in the present invention.

The sending unit 102 is configured to, after the current base station that serves the UE changes to the target base station that serves the UE, send the instruction information that is of the small data packet and acquired by the acquiring unit to the target base station that serves the UE, so that the target base station that serves the UE acquires the small data packet from the core network device according to the instruction information of the small data packet.

The acquiring unit 101 is further configured to receive the small data packet sent from the target base station that serves the UE.

Optionally, the sending unit 102 is further configured to send an RRC connection establishment request message to the target base station that serves the UE, where the RRC connection establishment request message includes the instruction information of the small data packet, so that the target base station that serves the UE sends a paging response message to the core network device according to the instruction information of the small data packet and receives the small data packet that is sent from the core network device according to the paging response message.

The acquiring unit 101 is further configured to receive an RRC connection establishment message sent from the target base station that serves the UE.

The RRC connection establishment message includes the small data packet.

Optionally, when a location area of the UE is updated, the sending unit 101 is further configured to send an RRC connection establishment request message to the target base station that serves the UE, where the RRC connection establishment request message includes the instruction information of the small data packet, so that after receiving a first location update message sent from the UE, the target base station that serves the UE sends a second location update message to the core network device according to the first location update message and receives a first location updating response message that is sent from the core network device according to the second location update message, where the second location update message includes the instruction information of the small data packet.

The first location updating response message includes the small data packet. The location area mainly includes a TAI, a LAI, and a RAI. A UMTS cell has at least one TAI and RAI, and an LTE cell has at least one TAI. When a cell camped on by the UE changes from one cell to another cell due to cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

The acquiring unit 101 is further configured to receive the first location updating response message sent from the target base station that serves the UE.

Specifically, the current base station that serves the UE receives the first paging message sent from the core network device and sends the second paging message to the UE, where the second paging message includes the instruction information of the small data packet; the UE sends the RRC connection establishment request message to the current base station that serves the UE according to the second paging message; when the UE waits for an RRC connection establishment message, the cell reselection occurs, and a cell of the target base station that serves the UE is selected, so that the UE sends the RRC connection establishment request message to the target base station that serves the UE, the target base station that serves the UE sends the RRC connection establishment message to the UE, and after receiving the RRC connection establishment message, the UE sends an RRC connection establishment complete message to the base station that serves the UE, thereby completing RRC connection establishment; after the RRC connection establishment is complete, the UE sends the first location update message to the target base station that serves the UE, and after receiving the first location update message, the target base station that serves the UE sends the second location update message to the core network device, so as to perform location update of the UE.

It should be noted that the foregoing target base station that serves the UE may also receive the small data packet that is sent from the core network device by using another message, and the small data packet is not limited to being carried in the first location updating response message. However, to reduce signaling overheads and increase transmission efficiency of the small data packet, preferably, the first location updating response message carries the small data packet, so that the target base station that serves the UE receives the small data packet by using the first location updating response message.

Likewise, the target base station that serves the UE may also send the small data packet to the UE by using another message, and the small data packet is not limited to being carried in the first location updating response message. However, to reduce signaling overheads and increase transmission efficiency of the small data packet, preferably, the first location updating response message carries the small data packet, so that the target base station that serves the UE sends the small data packet to the UE by using the first location updating response message.

Optionally, the sending unit 101 is further configured to, when a location area of the UE is updated, the current base station that serves the UE corresponds to a first core network device, and the target base station that serves the UE corresponds to a second core network device, send an RRC connection establishment request message to the target base station that serves the UE, where the RRC connection establishment request message includes the instruction information of the small data packet, so that after receiving a first location update message sent from the UE, the target base station that serves the UE sends a second location update message to the second core network device according to the first location update message, where the second location update message includes the instruction information of the small data packet, so that the second core network device acquires the small data packet from the first core network device according to the instruction information of the small data packet, and the target base station that serves the UE receives a second location updating response message sent from the second core network device, where the second location updating response message includes the small data packet.

The acquiring unit 101 is further configured to receive the second location updating response message sent from the target base station that serves the UE.

Specifically, the current base station that serves the UE receives the first paging message sent from the first core network device and sends the second paging message to the UE, where the second paging message includes the instruction information of the small data packet; the UE sends the RRC connection establishment request message to the current base station that serves the UE according to the second paging message; when the UE waits for an RRC connection establishment message, cell reselection occurs, and a cell of the target base station that serves the UE is selected, so that the UE sends the RRC connection establishment request message to the target base station that serves the UE; after an RRC connection is established, the UE sends the first location update message to the target base station that serves the UE.

It should be noted that the foregoing target base station that serves the UE may also receive the small data packet that is sent from the second core network device by using another message, and the small data packet is not limited to being carried in the second location updating response message. However, to reduce signaling overheads and increase transmission efficiency of the small data packet, preferably, the second location updating response message carries the small data packet, so that the target base station that serves the UE receives the small data packet by using the second location updating response message.

Likewise, the target base station that serves the UE may also send the small data packet to the UE by using another message, and the small data packet is not limited to being carried in the second location updating response message. However, to reduce signaling overheads and increase transmission efficiency of the small data packet, preferably, the second location updating response message carries the small data packet, so that the target base station that serves the UE sends the small data packet to the UE by using the second location updating response message.

Further, the second paging message further includes RRC connection establishment waiting time, and the sending unit 102 is further configured to, when the RRC connection establishment waiting time expires before the RRC connection establishment message sent from the target base station that serves the UE is received, send another RRC connection establishment request message to the target base station that serves the UE again.

For example, original establishment waiting time of the UE is two seconds, and the received RRC connection establishment waiting time is five seconds. When the RRC connection establishment waiting time (that is, five seconds) expires, the UE sends another RRC connection establishment request message to the target base station that serves the UE again or stops establishing the RRC connection.

In another implementation manner of this embodiment of the present invention, after receiving RRC connection establishment waiting time, the UE may also add the RRC connection establishment waiting time to original establishment waiting time. When time obtained after the RRC connection establishment waiting time is added to the original establishment waiting time expires before the RRC connection establishment message sent from the target base station that serves the UE is received, the UE sends another RRC connection establishment request message to the target base station that serves the UE again or stops a process of establishing the RRC connection.

For example, original establishment waiting time of the UE is two seconds, and the received RRC connection establishment waiting time is three seconds. When the time (that is, five seconds) obtained after the RRC connection establishment waiting time is added to the original establishment waiting time expires, the UE sends another RRC connection establishment request message to the target base station that serves the UE again or stops establishing the RRC connection.

The sending unit 102 is further configured to, after the RRC connection establishment request message is sent to the target base station that serves the UE and when set RRC connection establishment waiting time expires before the RRC connection establishment message sent from the target base station that serves the UE is received, send another RRC connection establishment request message to the target base station that serves the UE again.

Specifically, the RRC connection establishment waiting time is preset for the UE, and after receiving the instruction information of the small data packet, the UE starts a timer for timing.

For example, original establishment waiting time of the UE is two seconds, and the preset RRC connection establishment waiting time is five seconds. After receiving the instruction information of the small data packet, the UE performs timing according to the RRC connection establishment waiting time, and when the RRC connection establishment waiting time (that is, five seconds) expires, sends another RRC connection establishment request message to the target base station that serves the UE again or stops establishing the RRC connection.

By using the foregoing UE, the UE receives instruction information that is of a small data packet and sent from a current base station that serves the UE, and after the current base station that serves the UE changes to a target base station that serves the UE, sends the instruction information of the small data packet to the target base station that serves the UE, so that the target base station that serves the UE acquires the small data packet from a core network device, thereby avoiding a case in which in a small-data-packet transmission process, because the core network device delivers the small data packet directly to the base station that serves the UE, a storage burden is put on the base station that serves the UE. In addition, the small data packet is temporarily stored in the core network device, so that when the core network device initiates paging, a storage burden of a non-base station that serves the UE is also reduced, and normal transmission of data is ensured.

It may be clearly understood by a person skilled in the art that, for the purpose of convenient and brief description, for a specific description of a working process of the UE described above, reference may be made to a corresponding process in the foregoing method embodiment in FIG. 3, and details are not described herein again.

Figure 11:
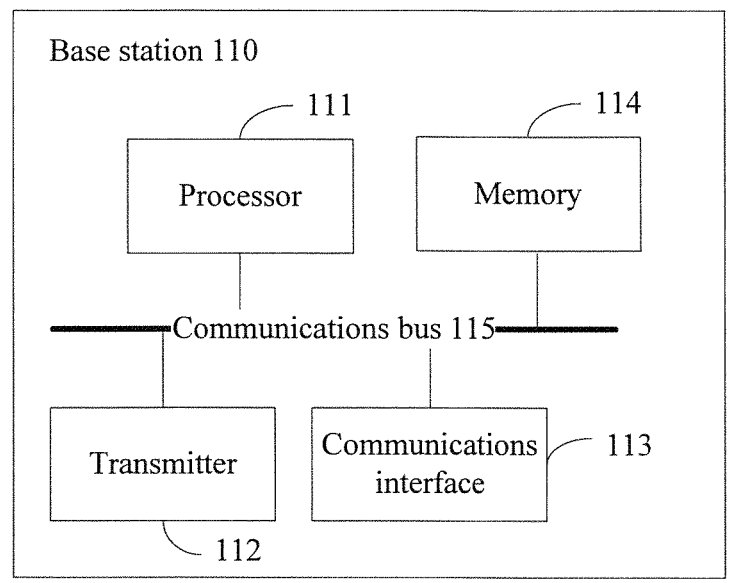
FIG. 11 is a schematic structural diagram of a base station according to still another embodiment of the present invention.

The present invention provides a base station 110, and as shown in FIG. 11, the base station 110 includes a processor 111, a transmitter 112, a communications interface 113, a memory 114, and a communications bus 115, where the processor 111, the transmitter 112, the communications interface 113, and the memory 114 implement mutual communication by using the communications bus 115.

The processor 111 may be a central processing unit CPU, or an application-specific integrated circuit application specific integrated circuit (ASIC), or one or more integrated circuits configured to implement this embodiment of the present invention.

The memory 114 is configured to store program code, where the program code includes a computer operation instruction. The memory 114 may include a high-speed RAM memory, and may also include a non-volatile memory, such as at least one disk memory.

The communications interface 113 is configured to implement connection and communication between these apparatuses.

The processor 111 executes the program code, and is configured to acquire instruction information of a small data packet, where the instruction information of the small data packet instructs a base station that serves a UE to transmit the small data packet; and after a radio resource control message sent from the UE is received, acquire the small data packet from a core network device according to the instruction information of the small data packet.

The transmitter 112 sends the small data packet acquired by the processor 111 to the UE.

Optionally, the processor 111 is further configured to receive a first paging message sent from the core network device, where the first paging message includes the instruction information of the small data packet.

Optionally, the processor 111 is further configured to, after an RRC connection establishment request message sent from the UE is received, send a paging response message to the core network device according to the instruction information of the small data packet, and receive the small data packet that is sent from the core network device according to the paging response message.

Optionally, the transmitter 112 is further configured to, after the processor 111 receives the first paging message sent from the core network device, send a second paging message to the UE, where the second paging message includes RRC connection establishment waiting time, and the RRC connection establishment waiting time is used for enabling the UE to send another RRC connection establishment request message to the base station again when the RRC connection establishment waiting time expires before an RRC connection establishment message sent from the base station is received.

The transmitter 112 is further configured to, after the processor 111 receives the first paging message sent from the core network device, send a second paging message to the UE, where the second paging message includes the instruction information of the small data packet, so that the UE sends another RRC connection establishment request message to the base station again when set RRC connection establishment waiting time expires before the RRC connection establishment message sent from the base station is received.

Optionally, the processor 111 is further configured to, when a current base station that serves the UE changes to the base station, receive the RRC connection establishment request message sent from the UE, where the RRC connection establishment request message includes the instruction information of the small data packet.

The transmitter 112 is further configured to, after the processor 111 receives the RRC connection establishment request message sent from the UE, send a paging response message to the core network device according to the instruction information that is of the small data packet and acquired by the processor 111.

The processor 111 is further configured to receive the small data packet that is sent from the core network device according to the paging response message.

The transmitter 112 is further configured to send an RRC connection establishment message to the UE, where the RRC connection establishment message includes the small data packet.

Optionally, the processor 111 is further configured to, when a current base station that serves the UE changes to the base station and a location area of the UE is updated, receive the RRC connection establishment request message sent from the UE, where the RRC connection establishment request message includes the instruction information of the small data packet.

The location area mainly includes a TAI, a LAI, and a RAI. A UMTS cell has at least one TAI and RAI, and an LTE cell has at least one TAI. When a cell camped on by the UE changes from one cell to another cell due to cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

The transmitter 112 is further configured to, after the processor 111 receives a first location update message sent from the UE, send a second location update message to the core network device according to the first location update message received by the processor 111, where the second location update message includes the instruction information of the small data packet.

The processor 111 is further configured to receive a first location updating response message that is sent from the core network device according to the second location update message, where the first location updating response message includes the small data packet.

The transmitter 112 is further configured to send the first location updating response message to the UE.

Optionally, the processor 111 is further configured to, when a current base station that serves the UE changes to the base station, the current base station that serves the UE corresponds to a first core network device, the base station corresponds to a second base station, and a location area of the UE is updated, receive the RRC connection establishment request message sent from the UE, where the RRC connection establishment request message includes the instruction information of the small data packet.

The transmitter 112 is further configured to, after the processor 111 receives the radio resource control message sent from the UE, send a second location update message to the second core network device according to the first location update message, where the second location update message includes the instruction information of the small data packet, so that the second core network device acquires the small data packet from the first core network device according to the instruction information of the small data packet.

The processor 111 is further configured to receive a second location updating response message sent from the second core network device, where the second location updating response message includes the small data packet.

The transmitter 112 is further configured to send the second location updating response message that includes the small data packet to the UE.

Figure 12:
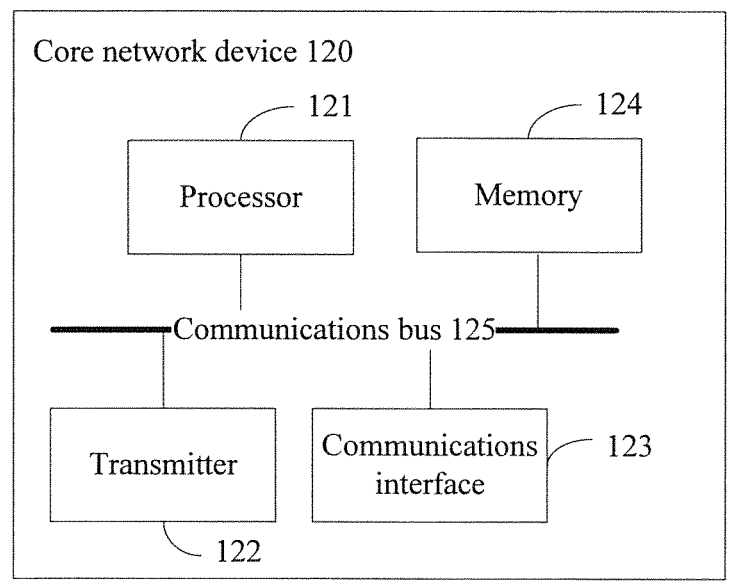
FIG. 12 is a schematic structural diagram of a core network device according to still another embodiment of the present invention.

The present invention provides a core network device 120, and as shown in FIG. 12, the core network device 120 includes a processor 121, a transmitter 122, a communications interface 123, a memory 124, and a communications bus 125, where the processor 121, the transmitter 122, the communications interface 123, and the memory 124 implement mutual communication by using the communications bus 125.

The processor 121 may be a central processing unit CPU, or an application-specific integrated circuit application specific integrated circuit (ASIC), or one or more integrated circuits configured to implement this embodiment of the present invention.

The memory 124 is configured to store program code, where the program code includes a computer operation instruction. The memory 124 may include a high-speed RAM memory, and may also include a non-volatile memory, such as at least one disk memory.

The communications interface 123 is configured to implement connection and communication between these apparatuses.

The processor 121 executes the program code, and is configured to acquire a small data packet.

The transmitter 122 is configured to send instruction information of the small data packet to a base station that serves a UE, so that after receiving a radio resource control message sent from the UE, the base station that serves the UE acquires the small data packet from the core network device according to the instruction information of the small data packet and sends the small data packet to the UE, where the instruction information of the small data packet instructs the base station that serves the UE to transmit the small data packet.

Optionally, the transmitter 122 is further configured to send a first paging message to the base station that serves the UE, where the first paging message includes the instruction information of the small data packet, so that after receiving an RRC connection establishment request message sent from the UE, the base station that serves the UE acquires the small data packet from the core network device according to the instruction information of the small data packet and sends an RRC connection establishment message to the UE, where the RRC connection establishment message includes the small data packet.

Optionally, the transmitter 122 is further configured to, when the base station that serves the UE changes from a current base station that serves the UE to a target base station that serves the UE, send a first paging message to the current base station that serves the UE, so that the current base station that serves the UE sends a second paging message to the UE, and after receiving an RRC connection establishment request message that is sent from the UE according to the second paging message, the target base station that serves the UE acquires the small data packet from the core network device according to the instruction information that is of the small data packet and included in the RRC connection establishment request message, and sends an RRC connection establishment message to the UE, where the first paging message and the second paging message include the instruction information of the small data packet, and the RRC connection establishment message includes the small data packet.

Optionally, the transmitter 122 is further configured to, when the base station that serves the UE changes from a current base station that serves the UE to a target base station that serves the UE and a location area of the UE is updated, send a first paging message to the current base station that serves the UE, so that the current base station that serves the UE sends a second paging message to the UE, and the UE sends an RRC connection establishment request message to the target base station that serves the UE according to the second paging message.

The RRC connection establishment request message includes the instruction information of the small data packet. After receiving a first location update message sent from the UE, the target base station that serves the UE acquires the small data packet from the core network device according to the instruction information of the small data packet, receives a first location updating response message sent from the core network device, and sends the first location updating response message to the UE, where the first paging message and the second paging message include the instruction information of the small data packet, and the first location updating response message includes the small data packet.

The location area mainly includes a TAI, a LAI, and a RAI. A UMTS cell has at least one TAI and RAI, and an LTE cell has at least one TAI. When a cell camped on by the UE changes from one cell to another cell due to the cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

Optionally, the transmitter 122 is further configured to, when the base station that serves the UE changes from a current base station that serves the UE to a target base station that serves the UE, the current base station that serves the UE corresponds to the core network device, the target base station that serves the UE corresponds to a second core network device, and a location area of the UE is updated, send a first paging message to the current base station that serves the UE, so that the current base station that serves the UE sends a second paging message to the UE, and the UE sends an RRC connection establishment request message to the target base station that serves the UE according to the second paging message, where the first paging message and the second paging message include the instruction information of the small data packet, and the RRC connection establishment request message includes the instruction information of the small data packet; after the target base station that serves the UE receives a first location update message sent from the UE, and the target base station that serves the UE sends a second location update message to the second core network device according to the first location update message, the second core network device acquires the small data packet from the core network device, and the base station that serves the UE receives a second location updating response message sent from the second core network device, and sends the second location updating response message to the UE, where the second location update message includes the instruction information of the small data packet.

The second location updating response message includes the small data packet.

Figure 13:
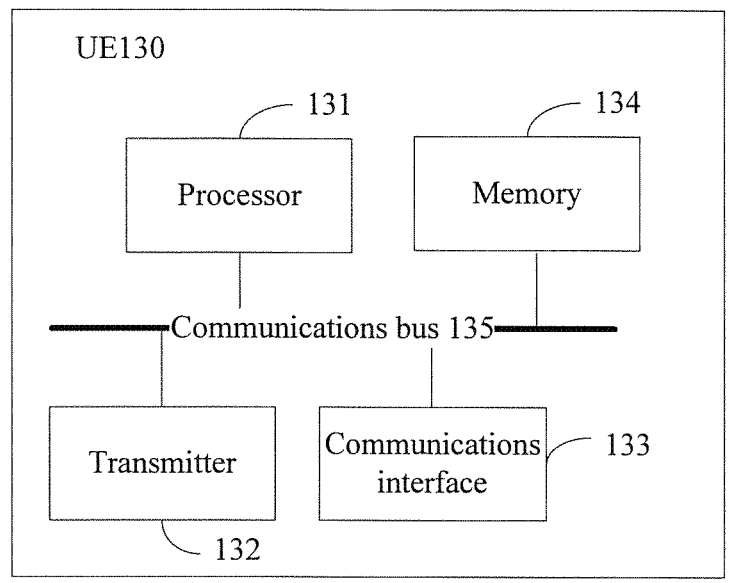
FIG. 13 is a schematic structural diagram of a UE according to still another embodiment of the present invention.

The present invention provides a UE 130, and as shown in FIG. 13, the UE 130 includes a processor 131, a transmitter 132, a communications interface 133, a memory 134, and a communications bus 135, where the processor 131, the transmitter 132, the communications interface 133, and the memory 134 implement mutual communication by using the communications bus 135.

The processor 131 may be a central processing unit CPU, or an application-specific integrated circuit Application Specific Integrated Circuit (ASIC), or one or more integrated circuits configured to implement this embodiment of the present invention.

The memory 134 is configured to store program code, where the program code includes a computer operation instruction. The memory 134 may include a high-speed RAM memory, and may also include a non-volatile memory, such as at least one disk memory.

The communications interface 133 is configured to implement connection and communication between these apparatuses.

The processor 131 executes the program code, and is configured to acquire instruction information that is of a small data packet and sent from a current base station that serves the UE.

The instruction information of the small data packet instructs a target base station that serves the UE to transmit the small data packet.

The transmitter 132 is configured to, after the current base station that serves the UE changes to the target base station that serves the UE, send the instruction information that is of the small data packet and acquired by the processor to the target base station that serves the UE, so that the target base station that serves the UE acquires the small data packet from a core network device according to the instruction information of the small data packet.

The processor 131 is further configured to receive the small data packet sent from the target base station that serves the UE.

Optionally, the processor 131 is further configured to, after the current base station that serves the UE receives a first paging message sent from the core network device, receive a second paging message sent from the current base station that serves the UE.

Both the first paging message and the second paging message include the instruction information of the small data packet.

Optionally, the transmitter 132 is further configured to send an RRC connection establishment request message to the target base station that serves the UE, where the RRC connection establishment request message includes the instruction information of the small data packet, so that the target base station that serves the UE sends a paging response message to the core network device according to the instruction information of the small data packet and receives the small data packet that is sent from the core network device according to the paging response message.

The processor 131 is further configured to receive an RRC connection establishment message sent from the target base station that serves the UE, where the RRC connection establishment message includes the small data packet.

Optionally, the transmitter 132 is further configured to send an RRC connection establishment request message to the target base station that serves the UE, where the RRC connection establishment request message includes the instruction information of the small data packet, so that after receiving a first location update message sent from the UE, the target base station that serves the UE sends a second location update message to the core network device according to the first location update message and receives a first location updating response message that is sent from the core network device according to the second location update message, where the second location update message includes the instruction information of the small data packet, and the first location updating response message includes the small data packet.

The processor 131 is further configured to receive the first location updating response message sent from the target base station that serves the UE.

Optionally, the transmitter 132 is further configured to, when a location area of the UE is updated, the current base station that serves the UE corresponds to a first core network device, and the target base station that serves the UE corresponds to a second core network device, send an RRC connection establishment request message to the target base station that serves the UE, where the RRC connection establishment request message includes the instruction information of the small data packet, so that after receiving a first location update message sent from the UE, the target base station that serves the UE sends a second location update message to the second core network device according to the first location update message, where the second location update message includes the instruction information of the small data packet, so that the second core network device acquires the small data packet from the first core network device according to the instruction information of the small data packet, and the target base station that serves the UE receives a second location updating response message sent from the second core network device.

The second location updating response message includes the small data packet. The location area mainly includes a TAI, a LAI, and a RAI. A UMTS cell has at least one TAI and RAI, and an LTE cell has at least one TAI. When a cell camped on by the UE changes from one cell to another cell due to cell reselection, the UE reads a system broadcast message of a new cell, where the system broadcast message indicates a TAI, a RAT, or a LAI of the cell. When the TAI, the RAI, or the LAI indicated by the system broadcast message is found different from a TAI, a RAI, or a LAI stored in the UE, the UE initiates a location area updating process after RRC connection establishment is complete. A location update message in this embodiment of the present invention includes but is not limited to a location area updating message, a routing area updating message, and a tracking area updating message.

The processor 131 is further configured to receive the second location updating response message sent from the target base station that serves the UE.

Optionally, the second paging message further includes RRC connection establishment waiting time, and the transmitter is further configured to, when the RRC connection establishment waiting time expires before the RRC connection establishment message sent from the target base station that serves the UE is received, send another RRC connection establishment request message to the target base station that serves the UE again.

The transmitter 132 is further configured to, after the RRC connection establishment request message is sent to the target base station that serves the UE and when set RRC connection establishment waiting time expires before the RRC connection establishment message sent from the target base station that serves the UE is received, send another RRC connection establishment request message to the target base station that serves the UE again.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

In the foregoing descriptions, the foregoing embodiments are merely intended for describing the technical solutions of the present application in detail, but descriptions of the foregoing embodiments are merely intended to help understand the method of the present invention and core ideas of the method, and shall not be construed as a limitation on the present invention. Any variation or replacement readily figured out by a person skilled in the art within the technical scope disclosed in the present invention shall fall within the protection scope of the present invention.

What is claimed is:

1. A data packet transmission method, comprising:
   receiving, by a current base station that serves a user equipment (UE), instruction information of a small data packet from a core network device in which the small data packet is stored, the instruction information of the small data packet for instructing a base station that serves the UE to transmit the small data packet to the UE;
   sending, by the current base station that serves the UE, a message to the UE after receiving the instruction information of the small data packet;
   receiving, by a target base station that serves the UE after the base station that serves the UE changes from the current base station that serves the UE to the target base station that serves the UE, a radio resource control message sent from the UE that includes the instruction information of the small data packet;
   sending, by the target base station that serves the UE after receiving the radio resource control message sent from the UE, a paging message to the core network device according to the instruction information of the small data packet;
   receiving, by the target base station, the small data packet from the core network device; and
   sending, by the target base station that serves the UE, the small data packet to the UE,
   wherein the target base station that serves the UE sends the small data packet to the UE by sending a radio resource control (RRC) connection establishment message to the UE, wherein the RRC connection establishment message comprises the small data packet.

2. The method according to claim 1, wherein the current base station that serves the UE receives the instruction information of the small data packet from the core network device in which the small data packet is stored by receiving a first paging message sent from the core network device, wherein the first paging message comprises the instruction information of the small data packet.

3. The method according to claim 2, wherein after receiving, by the current base station that serves the UE, the first paging message sent from the core network device, the method further comprising at least one of the following:
   sending a second paging message to the UE, wherein the second paging message comprises a radio resource control (RRC) connection establishment waiting time, and the RRC connection establishment waiting time is for enabling the UE to send another RRC connection establishment request message to the current base station that serves the UE again when the RRC connection establishment waiting time expires before the RRC connection establishment message sent from the current base station that serves the UE is received; and
   sending a second paging message to the UE, wherein the second paging message comprises the instruction information of the small data packet for the UE to send another RRC connection establishment request message to the current base station that serves the UE again when the RRC connection establishment waiting time expires before the RRC connection establishment message sent from the base station that serves the UE is received.

4. A data packet transmission method, comprising:
acquiring, by a core network device, a small data packet;
sending, by the core network device while the small data packet is stored in the core network device, instruction information of the small data packet to a current base station that serves a user equipment (UE);
receiving, by the core network device, a paging message according to the instruction information of the small data packet from a target base station that serves the UE after a base station that serves the UE changes from the current base station that serves the UE to the target base station that serves the UE, the paging message indicating that a radio resource control message sent from the UE that includes the instruction information of the small data packet has been received by the target base station that serves the UE; and
sending, by the core network device, after the paging message is received from the target base station that serves the UE, the small data packet to the target base station that serves the UE, the small data packet enabling the target base station that serves the UE to, after receiving the radio resource control message sent from the UE, send the small data packet to the UE,
wherein the instruction information of the small data packet instructs the base station that serves the UE to transmit the small data packet to the UE; and
sending, by the core network device, a first paging message to the current base station that serves the UE, wherein the first paging message comprises the instruction information of the small data packet, the first paging message enabling the current base station that serves the UE to, after receiving a radio resource control (RRC) connection establishment request message sent from the UE, receive the small data packet from the core network device according to the instruction information of the small data packet and send a radio resource control (RRC) connection establishment message to the UE, wherein the RRC connection establishment message comprises the small data packet.

5. The method according to claim 4, wherein the first paging message further comprises an RRC connection establishment waiting time, the first paging message enabling the current base station that serves the UE to send a second paging message that comprises the RRC connection establishment waiting time to the UE, wherein the RRC connection establishment waiting time is used for enabling the UE to send another RRC connection establishment request message to the base station that serves the UE again when the RRC connection establishment waiting time expires before the RRC connection establishment message sent from the base station that serves the UE is received.

6. The method according to claim 4, wherein a second paging message that is sent from the current base station that serves the UE to the UE comprises the instruction information of the small data packet, the second paging message enabling the UE to send another RRC connection establishment request message to the current base station that serves the UE again when an RRC connection establishment waiting time expires before the RRC connection establishment message sent from the current base station that serves the UE is received.

7. A data packet transmission method, comprising:
receiving, by a user equipment (UE) while a small data packet is stored on a core network device and when a base station that serves the UE is a current base station that serves the UE, instruction information of the small data packet sent from the current base station that serves the UE, the instruction information of the small data packet for instructing the base station that serves the UE to transmit the small data packet to the UE;
sending, by the UE, after the base station that serves the UE changes from the current base station that serves the UE to a target base station that serves the UE, the instruction information of the small data packet to the target base station that serves the UE for receiving the small data packet from the core network device after receiving, by the core network device, a paging message according to the instruction information of the small data packet; and
receiving, by the UE, the small data packet sent from the target base station that serves the UE after the small data packet is received from the core network device by the target base station that serves the UE in response to the paging message according to the instruction information of the small data packet, wherein:
sending, by the UE, the instruction information of the small data packet to the target base station for receiving the small data packet from the core network device according to the instruction information of the small data packet comprises:
sending, by the UE, a radio resource control (RRC) connection establishment request message to the target base station, wherein the RRC connection establishment request message comprises the instruction information of the small data packet, the RRC connection establishment message enabling the target base station to send a information of the small data packet and receive the small data packet that is sent from the core network device according to the paging response message; and
receiving, by the UE, the small data packet sent from the target base station after the small data packet is received from the core network device by the target base station comprises:
receiving, by the UE, an RRC connection establishment message sent from the target base station, wherein the RRC connection establishment message comprises the small data packet.

8. The method according to claim 7, wherein receiving, by the UE while the small data packet is stored on the core network device, the instruction information that is of the small data packet and sent from the current base station that serves the UE comprises:
receiving, by the UE, a second paging message sent from the current base station after the current base station receives a first paging message sent from the core network device, wherein both the first paging message and the second paging message comprise the instruction information of the small data packet.

9. A system, comprising:
a current base station that serves a user equipment (UE), the current base station configured to:
receive instruction information of a small data packet from a core network device in which the small data packet is stored, the instruction information of the small data packet for instructing a base station that serves the UE to transmit the small data packet to the UE, and send a message to the UE after receiving the instruction information of the small data packet; and a target base station that serves the UE, the target base station configured to:

receive, after the base station that serves the UE changes from the current base station that serves the UE to the target base station that serves the UE, a radio resource control message sent from the UE that includes the instruction information of the small data packet, after the radio resource control message sent from the UE is received, send a paging message to the core network device according to the instruction information of the small data packet, receive the small data packet from the core network device; and send the small data packet to the UE, wherein the target base station that serves the UE is further configured to send a radio resource control (RRC) connection establishment message to the UE, Wherein the RRC connection establishment message comprises the small data packet.

10. The system according to claim 9, wherein the current base station that serves the UE is further configured to receive a first paging message sent from the core network device, wherein the first paging message comprises the instruction information of the small data packet.

11. The system according to claim 10, wherein the current base station that serves the UE is further configured to, after the first paging message sent from the core network device is received, send a second paging message to the UE, wherein the second paging message comprises an RRC connection establishment waiting time, and the RRC connection establishment waiting time is for enabling the UE to send another RRC connection establishment request message to the current base station that serves the UE again when the RRC connection establishment waiting time expires before the RRC connection establishment message sent from the current base station that serves the UE is received.

12. The system according to claim 10, wherein the current base station that serves the UE is further configured to, after the first paging message sent from the core network device is received, send a second paging message to the UE, wherein the second paging message comprises the instruction information of the small data packet, the second paging message enabling the UE to send another RRC connection establishment request message to the current base station that serves the UE again when an RRC connection establishment waiting time expires before the RRC connection establishment message sent from the current base station that serves the UE is received.

13. A core network device, comprising:
a processor, configured to:
acquire a small data packet, and
receive a paging message according to instruction information of the small data packet from a target base station that serves a user equipment (UE) after a base station that serves the UE changes from a current base station that serves the UE to the target base station that serves the UE, the paging message indicating that a radio resource control message sent from the UE that includes the instruction information of the small data packet has been received by the target base station that serves the UE; and a transmitter, configured to:
send instruction information of the small data packet to the current base station that serves the UE while the small data packet is stored in the core network device, and
send the small data packet to the target base station that serves the UE after the paging message is received from the target base station that serves the UE the small data packet enabling the target base station that serves the UE to, after receiving the radio resource control message sent from the UE, send the small data packet to the UE, wherein the instruction information of the small data packet instructs the base station that serves the UE to transmit the small data packet to the UE, wherein the transmitter is further configured to send a first paging message to the current base station that serves the UE, wherein the first paging message comprises the instruction information of the small data packet, the first paging message enabling the current base station that serves the UE to, after receiving a radio resource control (RRC) connection establishment request message sent from the UE, receive the small data packet from the core network device according to the instruction information of the small data packet and send a radio resource control (RRC) connection establishment message to the UE, wherein the RRC connection establishment message comprises the small data packet.

14. A user equipment (UE), comprising:
a processor, configured to receive while a small data packet is stored on a core network device, instruction information of the small data packet and sent from a current base station that serves the UE, the instruction information of the small data packet for instructing a base station that serves the UE to transmit the small data packet to the UE;

a transmitter, configured to, after the current base station that serves the UE changes to a target base station that serves the UE, send the instruction information of the small data packet and acquired by the processor to the target base station that serves the UE, the instruction information of the small data packet enabling the target base station that serves the UE to receive the small data packet from the core network device after receiving, by the core network device, a paging message according to the instruction information of the small data packet; and wherein the processor is further configured to receive the small data packet sent from the target base station that serves the UE, which was received from the core network device in response to the paging message according to the instruction information of the small data packet, wherein:

the transmitter is further configured to send a radio resource control (RRC) connection establishment request message to the target base station that serves the UE, wherein the RRC connection establishment request message comprises the instruction information of the small data packet, the RRC connection establishment message enabling the target base station that serves the UE to send a paging response message to the core network device according to the instruction information of the small data packet and receive the small data packet that is sent from the core network device according to the paging response message, and the processor is further configured to receive a radio resource control (RRC) connection establishment message sent from the target base station that serves the UE, wherein the RRC connection establishment message comprises the small data packet.

15. The UE according to claim 14 wherein the processor is further configured to, after the current base station that serves the UE receives a first paging message sent from the core network device, receive a second paging message sent from the current base station that serves the UE, wherein both the first paging message and the second paging message comprise the instruction information of the small data packet.

* * * * *